United States Patent
Lu et al.

(10) Patent No.: US 10,262,648 B2
(45) Date of Patent: Apr. 16, 2019

(54) METHOD FOR CONTROLLING INTERFERENCE IN AUDIO SERVICE AND TERMINAL

(71) Applicant: Huawei Technologies Co., Ltd., Shenzhen (CN)

(72) Inventors: Henghui Lu, Beijing (CN); Jingqing Mei, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/067,043

(22) PCT Filed: Dec. 31, 2015

(86) PCT No.: PCT/CN2015/100288
§ 371 (c)(1),
(2) Date: Jun. 28, 2018

(87) PCT Pub. No.: WO2017/113372
PCT Pub. Date: Jul. 6, 2017

(65) Prior Publication Data
US 2019/0019488 A1  Jan. 17, 2019

(51) Int. Cl.
*G10K 11/16* (2006.01)
*H04R 3/00* (2006.01)
*H04W 4/80* (2018.01)

(52) U.S. Cl.
CPC ............ *G10K 11/16* (2013.01); *H04R 3/002* (2013.01); *H04W 4/80* (2018.02)

(58) Field of Classification Search
CPC .......... G10K 11/06; H04R 3/002; H04W 4/80
See application file for complete search history.

(56) References Cited

U.S. PATENT DOCUMENTS

| 8,750,850 | B2 | 6/2014 | Gupta |
| 2002/0193125 | A1 | 12/2002 | Smith |

(Continued)

FOREIGN PATENT DOCUMENTS

| CN | 102111314 A | 6/2011 |
| CN | 104601838 A | 5/2015 |

(Continued)

OTHER PUBLICATIONS

Machine Translation and Abstract of Chinese Publication No. CN102111314, Jun. 29, 2011, 12 pages.

(Continued)

*Primary Examiner* — Regina N Holder
(74) *Attorney, Agent, or Firm* — Conley Rose, P.C.

(57) ABSTRACT

A method for controlling interference in an audio service and a terminal, where the method includes sending, by a first terminal, a first message using a short-range wireless communications technology when executing an audio service, determining, by a second terminal according to the first message, whether the second terminal supports interference control, and adjusting, by the second terminal, a setting of the second terminal according to the interference control parameter when the second terminal supports the interference control, and the second terminal falls within a controlled range. It can be learned that in a process in which the first terminal performs interference control on the second terminal, the first terminal may send the first message to the second terminal without a need of a noise reduction device such that the second terminal adjusts the setting of the second terminal.

17 Claims, 9 Drawing Sheets

(56) References Cited

U.S. PATENT DOCUMENTS

2010/0112945 A1    5/2010  Hanif
2015/0201421 A1*   7/2015  Park .................... H04J 11/0056
                                                           455/452.1
2017/0075647 A1    3/2017  Mei

FOREIGN PATENT DOCUMENTS

CN        104936094 A      9/2015
JP        2012080191 A     4/2012
WO        2015124059 A1    8/2015

OTHER PUBLICATIONS

Machine Translation and Abstract of Chinese Publication No. CN104601838, May 6, 2015, 11 pages.
Machine Translation and Abstract of Chinese Publication No. CN104936094, Sep. 23, 2015, 13 pages.
Foreign Communication From a Counterpart Application, PCT Application No. PCT/CN2015/100288, English Translation of International Search Report dated Sep. 22, 2016, 2 pages.
Foreign Communication From a Counterpart Application, PCT Application No. PCT/CN2015/100288, English Translation of Written Opinion dated Sep. 22, 2016, 5 pages.
Machine Translation and Abstract of Japanese Publication No. JP2012080191, Apr. 19, 2012, 13 pages.
Foreign Communication From A Counterpart Application, European Application No. 15911997.3, Extended European Search Report dated Nov. 16, 2018, 15 pages.

* cited by examiner

METHOD FOR CONTROLLING INTERFERENCE IN AUDIO SERVICE AND TERMINAL

CROSS-REFERENCE TO RELATED APPLICATIONS

This application is a U.S. National Stage of International Patent Application No. PCT/CN2015/100288 filed on Dec. 31, 2015, which is hereby incorporated by reference in its entirety.

TECHNICAL FIELD

The present disclosure relates to the field of communications technologies, and in particular, to a cost-effective and easy-to-implement method for controlling interference in an audio service and a terminal.

BACKGROUND

Development of an information technology and a network technology has resulted in an increasingly popular audio service, such as a mobile phone call service, a voice short message service, and audio and video conferences. In daily life, when being executed, an audio service is usually likely to be interfered with by surrounding noise. For example, in a home environment, if a user answers a phone when a program is being played on a television, an audio service used by the user is inevitably interfered with by noise of the television program. As the audio service is increasingly widely applied, how to reduce noise interference in the audio service becomes increasingly important.

Most existing technologies for controlling audio interference are terminal side noise reduction technologies. Generally, there are two specific methods, (1) noise cancellation, and (2) automatic volume adjustment. In the first method, noise is detected first, then a backward wave of the noise is generated, and the backward wave of the noise is superimposed onto the noise to cancel the noise. In the second method, if a terminal detects ambient noise when executing an audio service, the terminal automatically adjusts volume of the terminal to resist the noise.

If the noise cancellation method in other approaches is used, noise cancellation efficiency is reduced because an additional noise reduction device needs to be configured. In addition, impact of noise on an audio service cannot be avoided during noise detection performed by the noise reduction device, and this results in a poor noise reduction effect. If the automatic volume adjustment method in the other approaches is selected, volume of a terminal needs to be increased frequently, and this reduces a life span of the terminal. In addition, power of the terminal needs to be consumed during increase of the volume of the terminal. Consequently, the power of the terminal is wasted, and further a standby time of the terminal is reduced.

SUMMARY

The present disclosure provides a method for controlling interference in an audio service and a terminal such that there is no need to add an additional noise reduction device, costs are low, and user experience is good.

A first aspect of embodiments of the present disclosure provides a method for controlling interference in an audio service, and the method includes, when a first terminal executes an audio service, sending, by the first terminal, a first message to a second terminal using a short-range wireless communications technology, where the short-range wireless communications technology is a BLUETOOTH technology, a WI-FI technology, an infrared (IR) technology, or an ultra-wideband technology, and the first message carries an interference control parameter, and the interference control parameter is used to indicate an action to be performed by the second terminal, receiving, by the second terminal, the first message, determining, by the second terminal according to the first message, that the second terminal supports interference control, where the following two conditions need to be met when the second terminal determines, according to the first message, that the second terminal supports the interference control.

(1) The second terminal receives the first message sent by the first terminal using a protocol layer of the first terminal, and the second terminal can correctly parse the first message.

(2) The second terminal determines whether a setting that can be performed by the second terminal matches the interference control parameter obtained by means of parsing, if the setting matches the interference control parameter, the second terminal determines that the second terminal supports the interference control, and if the setting does not match the interference control parameter, the second terminal determines that the second terminal does not support the interference control, and adjusting, by the second terminal, a setting of the second terminal according to the interference control parameter when the second terminal determines, according to the interference control parameter, that the second terminal supports the interference control, and that the second terminal falls within a controlled range in order to reduce or avoid noise interference caused to the first terminal by the second terminal that has adjusted the setting of the second terminal.

In this implementation, during the interference control performed on the second terminal, the first terminal may send the first message to the second terminal using the short-range wireless communications technology such that the second terminal may adjust the setting of the second terminal according to the interference control parameter when the second terminal supports the interference control, and the second terminal falls within the controlled range. This effectively reduces noise interference caused by the second terminal to the first terminal. During an implementation, volume of the second terminal does not need to be adjusted frequently, and power of the second terminal is effectively saved. In addition, an implementation process is simple, and a noise reduction effect is good.

With reference to the first aspect of the embodiments of the present disclosure, in a first implementation of the first aspect of the embodiments of the present disclosure, the first message further carries an interference control distance threshold parameter and a signal parameter, the second terminal determines a distance between the second terminal and the first terminal according to the signal parameter, if the distance between the second terminal and the first terminal is less than the interference control distance threshold parameter, the second terminal determines that the second terminal falls within the controlled range, if the distance between the second terminal and the first terminal is greater than or equal to the interference control distance threshold parameter, the second terminal determines that the second terminal falls beyond the controlled range, and that the second terminal calculates the distance between the second terminal and the first terminal includes the second terminal determines, according to the signal parameter, that a sending time at which the first terminal sends the first message is t1, the second terminal determines, according to the signal parameter, a signal receiving time t2 at which the second terminal receives the first message, and in this case, the distance between the first terminal and the second terminal is:

$$D=(t2-t1)\times C,$$

where C is a propagation speed of an electromagnetic wave, and $C=3\times10^8$ meters per second (m/s).

In this implementation, the second terminal can determine, according to the distance between the second terminal and the first terminal, whether the second terminal falls within the controlled range. The first terminal performs interference control on the second terminal only when the second terminal falls within the controlled range. This avoids controlling a terminal that does not cause noise interference to the first terminal, and effectively ensures that the terminal that does not cause noise interference to the first terminal works normally.

With reference to the first aspect of the embodiments of the present disclosure, in a second implementation of the first aspect of the embodiments of the present disclosure, the first terminal determines a distance between the first terminal and the second terminal according to the signal parameter, the first terminal determines, according to the distance between the first terminal and the second terminal, whether the second terminal falls within the controlled range, if the distance between the second terminal and the first terminal is less than the interference control distance threshold parameter, the first terminal determines that the second terminal falls within the controlled range, if the distance between the second terminal and the first terminal is greater than or equal to the interference control distance threshold parameter, the first terminal determines that the second terminal falls beyond the controlled range, and the first terminal generates the first message if the first terminal determines, according to the signal parameter and the interference control distance threshold parameter, that the second terminal falls within the controlled range.

In this implementation, the first terminal can determine, according to the distance between the second terminal and the first terminal, whether the second terminal falls within the controlled range. The first terminal performs interference control on the second terminal only when the second terminal falls within the controlled range. This avoids controlling a terminal that does not cause noise interference to the first terminal, and effectively ensures that the terminal that does not cause noise interference to the first terminal works normally.

With reference to the first aspect of the embodiments of the present disclosure, in a third implementation of the first aspect of the embodiments of the present disclosure, the second terminal adjusts the setting of the second terminal according to the interference control parameter when the second terminal supports the interference control, the second terminal falls within the controlled range, and the second terminal is generating a sound.

With reference to the first aspect of the embodiments of the present disclosure, in a fourth implementation of the first aspect of the embodiments of the present disclosure, the first message further carries an interference control duration parameter, the second terminal starts a timer, and sets a timing time of the timer equal to the interference control duration parameter, the second terminal adjusts the setting of the second terminal according to the interference control parameter if the second terminal does not receive an interference control end command sent by the first terminal, and the second terminal needs to perform work of generating a sound within the timing time of the timer, and when the timer expires, the second terminal restores the original setting of the second terminal.

In this implementation, the second terminal can adjust the setting of the second terminal according to the interference control duration parameter such that the second terminal can immediately restore the setting of the second terminal when the first terminal completes work. Therefore, it can be ensured that the second terminal immediately restores normal work when the second terminal does not cause noise interference to the first terminal, and unnecessary interference control performed on the second terminal is avoided.

With reference to the method according to any one of the first aspect of the embodiments of the present disclosure to the fourth implementation of the first aspect of the embodiments of the present disclosure, in a fifth implementation of the first aspect of the embodiments of the present disclosure, the method further includes detecting, by the first terminal, displacement of the first terminal using a built-in inertial sensor, where the inertial sensor is an accelerometer, a gyroscope, or a magnetometer, when the displacement exceeds a preset threshold, sending, by the first terminal, a second message using the short-range wireless communications technology, where the second message carries an interference control distance threshold parameter and a signal parameter, and receiving, by the second terminal, the second message, and restoring, by the second terminal, the original setting of the second terminal when the second terminal determines, according to the interference control distance threshold parameter and the signal parameter that are carried in the second message, that the second terminal falls beyond the controlled range.

In this implementation, the first terminal can detect the displacement of the first terminal when executing the audio service. When the displacement exceeds the preset threshold, the first terminal sends the second message to the second terminal such that the second terminal adjusts the setting of the second terminal according to the interference control parameter. Therefore, in this embodiment, audio interference control performed on different second terminals can be adjusted in a timely manner according to a change in the displacement of the first terminal, and accuracy of interference control for the audio service is improved.

With reference to the method according to any one of the first aspect of the embodiments of the present disclosure to the fifth implementation of the first aspect of the embodiments of the present disclosure, in a sixth implementation of the first aspect of the embodiments of the present disclosure, the interference control parameter is used to indicate that the action to be performed by the second terminal includes one or more of the following actions of muting, decreasing volume, pausing, switching to a headset mode, or turning off.

With reference to the method according to any one of the second implementation of the first aspect of the embodiments of the present disclosure to the sixth implementation of the first aspect of the embodiments of the present disclosure, in a seventh implementation of the first aspect of the embodiments of the present disclosure, the signal parameter is a parameter related to distance measurement, and the signal parameter includes one or more of a signal receiving time and a signal sending time, or received signal power and transmitted signal power.

A second aspect of the embodiments of the present disclosure provides a method for controlling interference in an audio service, and the method includes receiving, by a terminal using a short-range wireless communications technology, a first message sent by another terminal that is executing an audio service, where the short-range wireless communications technology is a BLUETOOTH technology, a WI-FI technology, an IR technology, or an ultra-wideband technology, and the first message carries an interference control parameter, and the interference control parameter is used to indicate an action to be performed by the terminal, determining, by the terminal according to the first message, that the terminal supports interference control, where the following two conditions need to be met when the terminal determines, according to the first message, that the terminal supports the interference control.

(1) The terminal receives the first message sent by the other terminal using a protocol layer of the other terminal, and the terminal can correctly parse the first message.

(2) The terminal determines whether a setting that can be performed by the terminal matches the interference control parameter obtained by means of parsing, if the setting matches the interference control parameter, the terminal determines that the terminal supports the interference control, and if the setting does not match the interference control parameter, the terminal determines that the terminal does not support the interference control, and adjusting, by the terminal, a setting of the terminal according to the interference control parameter when the terminal determines, according to the interference control parameter, that the terminal supports the interference control, and that the terminal falls within a controlled range in order to reduce or avoid noise interference caused to the other terminal by the terminal that has adjusted the setting of the terminal.

In this implementation, during the interference control performed on the terminal, the other terminal may send the first message to the terminal using the short-range wireless communications technology such that the terminal may adjust the setting of the terminal according to the interference control parameter when the terminal supports the interference control, and the terminal falls within the controlled range. This effectively reduces noise interference caused by the terminal to the other terminal, and can be implemented easily without complex operations at low costs.

With reference to the second aspect of the embodiments of the present disclosure, in a first implementation of the second aspect of the embodiments of the present disclosure, the first message further carries an interference control distance threshold parameter and a signal parameter, the terminal determines a distance between the terminal and the other terminal according to the signal parameter, if the distance between the terminal and the other terminal is less than the interference control distance threshold parameter, the terminal determines that the terminal falls within the controlled range, if the distance between the terminal and the other terminal is greater than or equal to the interference control distance threshold parameter, the terminal determines that the terminal falls beyond the controlled range, and that the terminal calculates the distance between the terminal and the other terminal is the terminal determines, according to the signal parameter, that a sending time at which the other terminal sends the first message is t1, the terminal determines, according to the signal parameter, a signal receiving time t2 at which the terminal receives the first message, and in this case, the distance between the other terminal and the terminal is:

$$D=(t2-t1) \times C,$$

where C is a propagation speed of an electromagnetic wave, and $C=3 \times 10^8$ m/s.

In this implementation, the terminal can determine, according to the distance between the terminal and the other terminal, whether the terminal falls within the controlled range. The other terminal performs interference control on the terminal only when the terminal falls within the controlled range. This avoids controlling a terminal that does not cause noise interference to the other terminal, and effectively ensures that the terminal that does not cause noise interference to the other terminal works normally.

With reference to the second aspect of the embodiments of the present disclosure, in a second implementation of the second aspect of the embodiments of the present disclosure, the terminal adjusts the setting of the second terminal according to the interference control parameter when the terminal supports the interference control, the terminal falls within the controlled range, and the terminal is generating a sound.

With reference to the second aspect of the embodiments of the present disclosure, in a third implementation of the second aspect of the embodiments of the present disclosure, the first message further carries an interference control duration parameter, the terminal starts a timer, and sets a timing time of the timer equal to the interference control duration parameter, the terminal adjusts the setting of the second terminal according to the interference control parameter if the terminal does not receive an interference control end command sent by the other terminal, and the terminal needs to perform work of generating a sound within the timing time of the timer, and when the timer expires, the terminal restores the original setting of the terminal.

In this implementation, the terminal can adjust the setting of the terminal according to the interference control duration parameter such that the terminal can immediately restore the setting of the terminal when the other terminal completes work. Therefore, it can be ensured that the terminal immediately restores normal work when the terminal does not cause noise interference to the other terminal, and unnecessary interference control performed on the terminal is avoided.

With reference to the method according to any one of the second aspect of the embodiments of the present disclosure to the third implementation of the second aspect, in a fourth implementation of the second aspect of the embodiments of the present disclosure, the method further includes receiving, by the terminal, a second message, where the second message carries an interference control distance threshold parameter and a signal parameter, and restoring, by the terminal, the original setting of the terminal when the terminal determines, according to the interference control distance threshold parameter and the signal parameter that are carried in the second message, that the terminal falls beyond the controlled range.

With reference to the method according to any one of the second aspect of the embodiments of the present disclosure to the fourth implementation of the second aspect, in a fifth implementation of the second aspect of the embodiments of the present disclosure, the interference control parameter is used to indicate that the action to be performed by the terminal includes one or more of the following actions of muting, decreasing volume, pausing, switching to a headset mode, or turning off.

With reference to the method according to any one of the second aspect of the embodiments of the present disclosure to the fourth implementation of the second aspect, in a fifth implementation of the second aspect of the embodiments of the present disclosure, With reference to the method according to any one of the first implementation of the second aspect of the embodiments of the present disclosure to the fifth implementation of the second aspect, in a sixth implementation of the second aspect of the embodiments of the present disclosure, the signal parameter is a parameter related to distance measurement, and the signal parameter includes one or more of a signal receiving time and a signal sending time, or received signal power and transmitted signal power.

A third aspect of the embodiments of the present disclosure provides a terminal, and the terminal includes parts such as an antenna, a processor, an input unit, an output unit, a storage unit, and a power supply, these parts communicate with each other using one or more buses, the input unit is configured to implement interaction between a user and the terminal and/or input information to the terminal, the input unit may be a touch panel, or may be another human-machine interaction interface such as a substantive input key and a microphone, or may be another apparatus for obtaining external information, such as a camera, the processor is a control center of the terminal, is connected to each part of the entire terminal using various interfaces and lines, and performs various functions of the terminal and/or processes data by running or executing a software program and/or a module stored in the storage unit and by invoking data stored in the storage unit, and the processor may include an integrated circuit (IC), for example, may include a singly-encapsulated IC, or may include multiple connected encapsulated ICs with a same function or different functions, the antenna is configured to establish a communication channel, the output unit is optionally configured to output an image and/or a sound, the storage unit may be configured to store the software program and the module, and the processor performs various functional applications of the terminal and processes data by running the software program and the module stored in the storage unit, the storage unit mainly includes a program storage area and a digital storage area, the power supply is configured to supply power to different parts of the terminal to maintain running of the parts, further, the antenna is configured to receive a first message, where the first message carries an interference control parameter, and the interference control parameter is used to indicate an action to be performed by the terminal, where the antenna receives the first message based on a BLUETOOTH technology, a WI-FI technology, an IR technology, or an ultra-wideband technology, further, the processor is configured to adjust a setting of the terminal according to the interference control parameter when the processor determines, according to the interference control parameter, that the terminal supports interference control, and that the terminal falls within a controlled range in order to reduce or avoid noise interference caused, to a terminal sending the first message, by the terminal that has adjusted the setting of the terminal, where the following two conditions need to be met when the terminal determines, according to the first message, that the terminal supports the interference control.

(1) The terminal receives the first message that is sent by a terminal executing an audio service, where the first message is sent by the terminal using a protocol layer of the terminal executing the audio service, and the terminal can correctly parse the first message.

(2) The terminal determines whether a setting that can be performed by the terminal matches the interference control parameter obtained by means of parsing, if the setting matches the interference control parameter, the terminal determines that the terminal supports the interference control, and if the setting does not match the interference control parameter, the terminal determines that the terminal does not support the interference control, and the terminal adjusts the setting of the terminal according to the interference control parameter when the terminal determines, according to the interference control parameter, that the terminal supports the interference control, and that the terminal falls within the controlled range in order to reduce or avoid noise interference caused, to the terminal executing the audio service, by the terminal that has adjusted the setting of the terminal.

In this implementation, during the interference control performed on the terminal, the terminal may control noise interference using the received first message such that the terminal may adjust the setting of the terminal according to the interference control parameter when the terminal supports the interference control, and the terminal falls within the controlled range. This effectively reduces noise interference caused by the terminal to the terminal executing the audio service. During an implementation, volume of the terminal does not need to be adjusted frequently, and power of the terminal is effectively saved. In addition, an implementation process is simple, and a noise reduction effect is good.

With reference to the third aspect of the embodiments of the present disclosure, in a first implementation of the third aspect of the embodiments of the present disclosure, the processor is further configured to, when the terminal executes an audio service, send a second message using the antenna, where the second message carries the interference control parameter, and the terminal executing the audio service sends the second message based on the BLUETOOTH technology, the WI-FI technology, the IR technology, or the ultra-wideband technology.

With reference to the third aspect of the embodiments of the present disclosure or the first implementation of the third aspect of the embodiments of the present disclosure, in a second implementation of the third aspect of the embodiments of the present disclosure, the first message further carries an interference control distance threshold parameter and a signal parameter, and the processor is further configured to determine, according to the interference control distance threshold parameter and the signal parameter that are carried in the first message, that the second terminal falls within the controlled range, the terminal determines, according to the signal parameter, a distance between the terminal and the terminal executing the audio service, if the distance between the terminal and the terminal executing the audio service is less than the interference control distance threshold parameter, the terminal determines that the terminal falls within the controlled range, if the distance between the terminal and the terminal executing the audio service is greater than or equal to the interference control distance threshold parameter, the terminal determines that the terminal falls beyond the controlled range, and that the terminal calculates the distance between the terminal and the terminal executing the audio service includes that the terminal determines, according to the signal parameter, that a sending time at which the terminal executing the audio service sends the first message is t1, the terminal determines, according to the signal parameter, a signal receiving time t2 at which the terminal receives the first message, and in this case, the distance between the terminal executing the audio service and the terminal is:

$$D=(t2-t1)\times C,$$

where C is a propagation speed of an electromagnetic wave, and $C=3\times10^8$ m/s.

In this implementation, the terminal can determine, according to the distance between the terminal and the terminal executing the audio service, whether the terminal falls within the controlled range. The terminal executing the audio service performs interference control on the terminal only when the terminal falls within the controlled range. This avoids a case in which a terminal that does not cause noise interference to the terminal executing the audio service is controlled, and effectively ensures that the terminal that does not cause noise interference to the terminal executing the audio service works normally.

With reference to the first implementation of the third aspect of the embodiments of the present disclosure, in a third implementation of the third aspect of the embodiments of the present disclosure, the antenna is further configured to receive a signal parameter sent by another terminal, and the processor is further configured to generate the second message when it is determined, according to the signal parameter and an interference control distance threshold parameter when the terminal executes the audio service, that the other terminal falls within a controlled range.

With reference to the third aspect of the embodiments of the present disclosure or the first implementation of the third aspect of the embodiments of the present disclosure, in a third implementation of the third aspect of the embodiments of the present disclosure, that the processor is configured to adjust a setting of the terminal according to the interference control parameter when the processor determines, according to the interference control parameter, that the terminal supports interference control, and that the terminal falls within a controlled range includes that the processor is further configured to adjust the setting of the terminal according to the interference control parameter when the terminal supports the interference control, the terminal falls within the controlled range, and the terminal is generating a sound.

With reference to the third aspect of the embodiments of the present disclosure or the first implementation of the third aspect of the embodiments of the present disclosure, in a fourth implementation of the third aspect of the embodiments of the present disclosure, the first message further carries an interference control duration parameter, the processor is configured to start a timer, and set a timing time of the timer equal to the interference control duration parameter, the terminal adjusts the setting of the terminal according to the interference control parameter if the terminal does not receive an interference control end command sent by the terminal executing the audio service, and the terminal needs to perform work of generating a sound within the timing time of the timer, and when the timer expires, the terminal restores the original setting of the terminal.

In this implementation, the terminal can adjust the setting of the terminal according to the interference control duration parameter such that the terminal can immediately restore the setting of the terminal when the terminal executing the audio service completes work. Therefore, the terminal can immediately restore normal work when the terminal does not cause noise interference to the terminal executing the audio service, and unnecessary interference control performed on the terminal is avoided.

With reference to the third aspect of the embodiments of the present disclosure to the fourth implementation of the third aspect of the embodiments of the present disclosure, in a fifth implementation of the third aspect of the embodiments of the present disclosure, the processor is further configured to detect, by the terminal, displacement of the terminal when the terminal executes the audio service, where the processor detects the displacement of the first terminal using a built-in inertial sensor, and the inertial sensor is an accelerometer, a gyroscope, or a magnetometer, and when the displacement exceeds a preset threshold, send a third message using the antenna, where the third message carries an interference control distance threshold parameter and a signal parameter.

With reference to the third aspect of the embodiments of the present disclosure to the fourth implementation of the third aspect of the embodiments of the present disclosure, in a sixth implementation of the third aspect of the embodiments of the present disclosure, the antenna is further configured to receive a fourth message, and the processor is further configured to restore, by the terminal, the original setting of the terminal when the processor determines, according to an interference control distance threshold parameter and a signal parameter that are carried in the fourth message, that the terminal falls beyond the controlled range.

In this implementation, the terminal executing the audio service can detect the displacement of the terminal when executing the audio service. When the displacement exceeds the preset threshold, the terminal executing the audio service sends the third message to the terminal such that the terminal adjusts the setting of the terminal according to the interference control parameter. Therefore, in this embodiment, audio interference control performed on different terminals can be adjusted in a timely manner according to a change in the displacement of the terminal executing the audio service, and accuracy of interference control for the audio service is improved.

With reference to the third aspect of the embodiments of the present disclosure to the sixth implementation of the third aspect of the embodiments of the present disclosure, in a seventh implementation of the third aspect of the embodiments of the present disclosure, the interference control parameter is used to indicate that the action to be performed by the terminal includes one or more of the following actions muting, decreasing volume, pausing, switching to a headset mode, or turning off.

With reference to the third aspect of the embodiments of the present disclosure to the seventh implementation of the third aspect of the embodiments of the present disclosure, in an eighth implementation of the third aspect of the embodiments of the present disclosure, the signal parameter is a parameter related to distance measurement, and the signal parameter includes one or more of the following a signal receiving time and a signal sending time, or received signal power and transmitted signal power.

The present disclosure provides the method for controlling interference in an audio service and the terminal. In a process in which the first terminal performs interference control on the second terminal, the first terminal may send the first message to the second terminal using the short-range wireless communications technology without a need of an additional noise reduction device such that when the second terminal supports the interference control, and the second terminal falls within the controlled range, the second terminal may adjust the setting of the second terminal according to the interference control parameter carried in the first message. This effectively reduces or avoids noise interference caused to the first terminal by the second terminal that has adjusted the setting of the second terminal. During an implementation, volume of the second terminal does not need to be adjusted frequently, and power of the second terminal is effectively saved. In addition, an implementation process is simple, and a noise reduction effect is good.

DESCRIPTION OF EMBODIMENTS

A system in which an interference control method in an embodiment of the present disclosure can be implemented is described first.

The system in this embodiment includes a first terminal and a second terminal. The first terminal and the second terminal can exchange information.

Further, in this embodiment, the first terminal may exchange information with the second terminal using a BLUETOOTH technology, a WI-FI technology, an IR technology, or an ultra-wideband technology.

Further, the first terminal in this embodiment is a terminal that can execute an audio service.

The audio service may be a service related to audio collection and audio play. For example, the audio service may be a terminal call service, a WECHAT service, a voice short message service, or audio and video conference services.

The first terminal is not limited in this embodiment, provided that the first terminal can execute the audio service. For example, the first terminal may be a terminal device such as a smartphone, a tablet computer, or an in-vehicle terminal.

The second terminal in this embodiment is a terminal that can cause noise interference to the first terminal that is executing the audio service.

The second terminal is not limited in this embodiment, provided that the second terminal that is working can cause noise interference to the first terminal that is executing the audio service. For example, the second terminal may be a television, a washing machine, a vacuum cleaner, a smartphone, a tablet computer, or an in-vehicle terminal.

It can be learned that the first terminal and the second terminal may be a same terminal or different terminals. This is not limited in this embodiment.

Figure 1A:
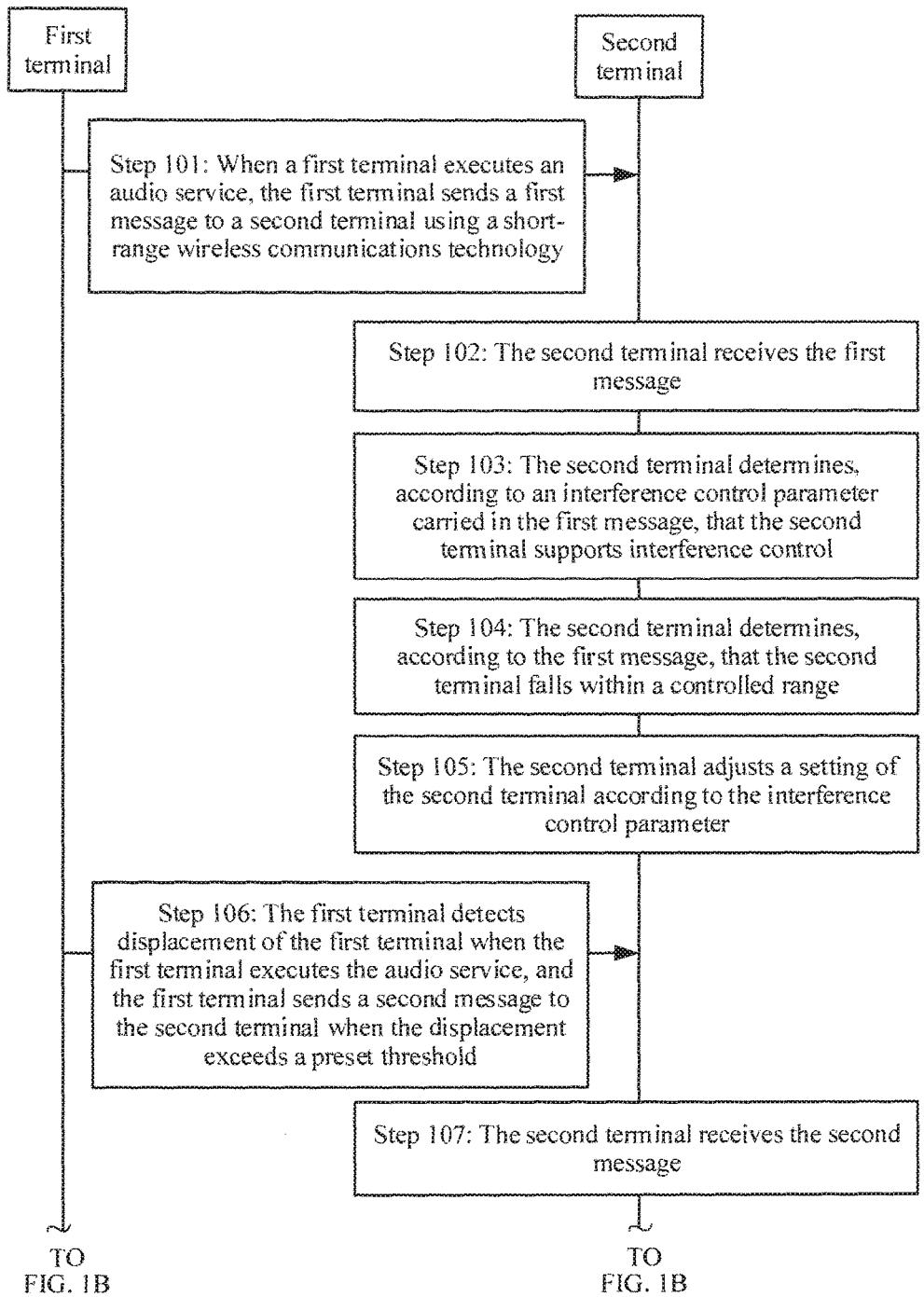
FIG. 1A and FIG. 1B are a step flowchart of an embodiment of a method for controlling interference in an audio service according to an embodiment of the present disclosure.
Figure 1B:
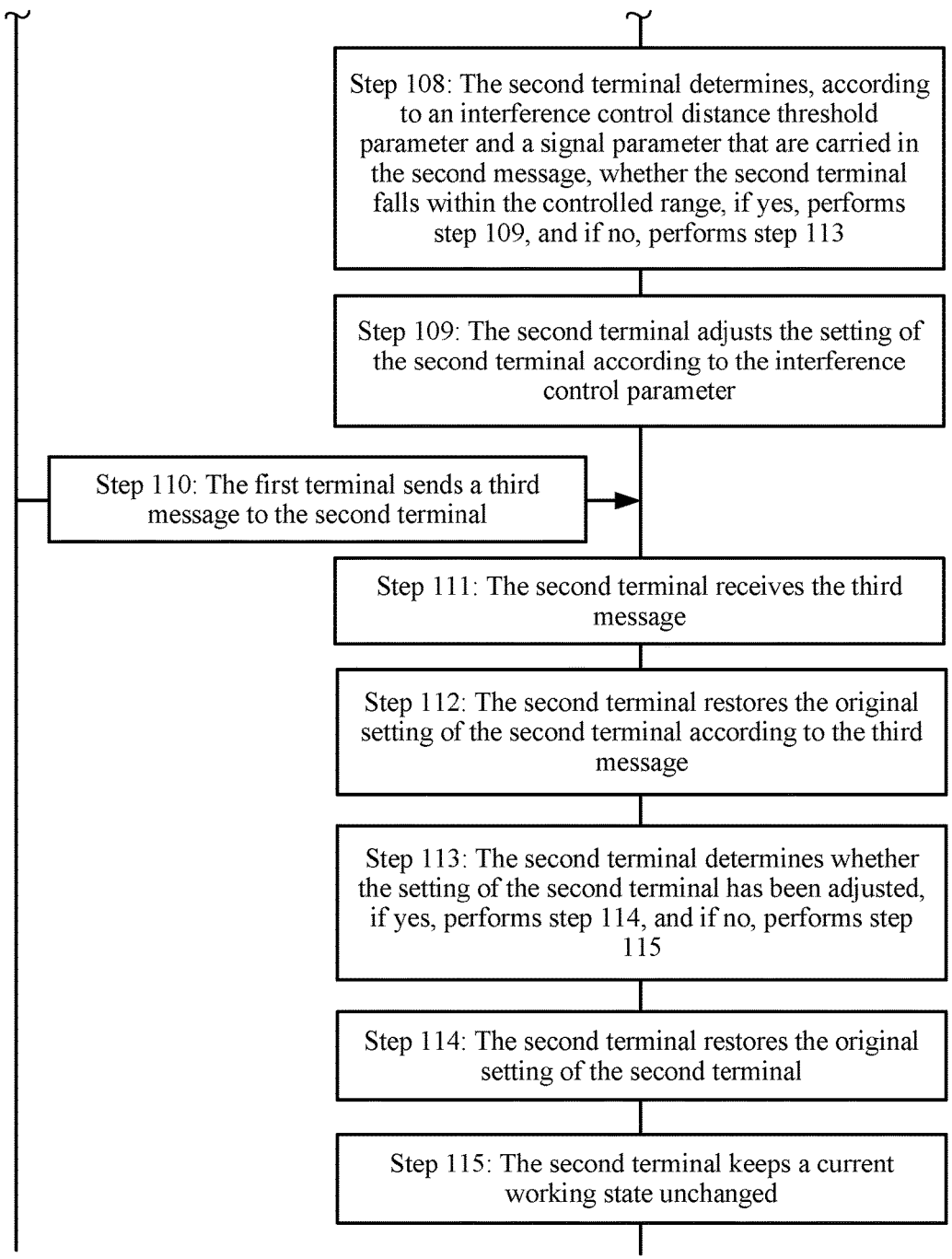

The following further describes a method for controlling interference in an audio service provided in an embodiment of the present disclosure with reference to FIG. 1A and FIG. 1B.

Step 101: When a first terminal executes an audio service, the first terminal sends a first message to a second terminal using a short-range wireless communications technology.

The short-range wireless communications technology mainly features a short communication distance, low costs, low power consumption, and a capability to implement peer-to-peer communications.

Further, the short-range wireless communications technology may be a BLUETOOTH technology, a WI-FI technology, an IR technology, an ultra-wideband technology, or the like.

For an implementation process of the short-range wireless communications technology, refer to the other approaches. Details are not described in this embodiment.

Further, in this embodiment, the first terminal broadcasts the first message using the short-range wireless communications technology.

The first message carries an interference control parameter.

Further, the interference control parameter is used to indicate an action to be performed by the second terminal.

The interference control parameter is not limited in this embodiment, provided that noise interference caused by the second terminal to the first terminal can be reduced or avoided when the second terminal performs the action that is indicated by the interference control parameter carried in the first message.

Step 102: The second terminal receives the first message.

Optionally, the second terminal may receive the first message based on the BLUETOOTH technology, the WI-FI technology, the IR technology, the ultra-wideband technology, or the like.

Step 103: The second terminal determines, according to the interference control parameter carried in the first message, that the second terminal supports interference control.

Further, the following two conditions need to be met when the second terminal determines, according to the first message, that the second terminal supports the interference control.

(1) The second terminal receives the first message sent by the first terminal using a protocol layer of the first terminal, and the second terminal can correctly parse the first message.

(2) The second terminal determines whether a setting that can be performed by the second terminal matches the interference control parameter obtained by means of parsing, if the setting matches the interference control parameter, the second terminal determines that the second terminal supports the interference control, and if the setting does not match the interference control parameter, the second terminal determines that the second terminal does not support the interference control.

The interference control parameter is not limited in this embodiment, provided that noise interference caused by the second terminal to the first terminal that is executing the audio service can be avoided or reduced when the second terminal performs the action indicated by the interference control parameter.

Further, if the second terminal determines that the second terminal can perform the action indicated by the interference control parameter, the second terminal determines that the second terminal supports the interference control.

If the second terminal determines that the second terminal cannot perform the action indicated by the interference control parameter, the second terminal determines that the second terminal does not support the interference control.

Further, the interference control parameter in this embodiment may be optionally one or more of muting, decreasing volume, pausing, switching to a headset mode, turning off, or the like.

For example, if the second terminal determines that the interference control parameter carried in the first message is pausing and decreasing volume, and the second terminal determines, according to a setting of the second terminal, that the second terminal can pause and/or decrease volume, the second terminal may determine that the second terminal supports the interference control. If the second terminal determines, according to the setting of the second terminal, that the second terminal cannot pause and decrease volume, the second terminal may determine that the second terminal does not support the interference control.

Step 104: The second terminal determines, according to the first message, that the second terminal falls within a controlled range.

The controlled range is not limited in this embodiment, provided that when the second terminal falls within the controlled range, the second terminal can cause interference to the first terminal that is executing the audio service.

The first message further carries an interference control distance threshold parameter and a signal parameter.

A specific manner of setting the interference control distance threshold parameter is not limited in this embodiment.

Optionally, the interference control distance threshold parameter may be pre-stored in the first terminal.

Optionally, the first terminal may store a control distance threshold list, and the control distance threshold list includes correspondences between different audio services executed by the first terminal and different interference control distance threshold parameters.

Further, the first terminal may send different interference control distance threshold parameters to the second terminal according to different audio services executed by the first terminal.

For example, the control distance threshold list includes a correspondence between a voice call service and an interference control distance threshold parameter of 5 meters (m). If the first terminal executes the voice call service, the first terminal may send the interference control distance threshold parameter of 5 m to the second terminal using the first message.

For another example, the control distance threshold list includes a correspondence between an audio play service and an interference control distance threshold parameter of 10 m. If the first terminal executes the audio play service, the first terminal may send the interference control distance threshold parameter of 10 m to the second terminal using the first message.

In this embodiment, the second terminal can determine a distance between the second terminal and the first terminal according to the signal parameter.

If the distance between the second terminal and the first terminal is less than the interference control distance threshold parameter, the second terminal determines that the second terminal falls within the controlled range.

If the distance between the second terminal and the first terminal is greater than or equal to the interference control distance threshold parameter, the second terminal determines that the second terminal falls beyond the controlled range.

The following describes details of how the second terminal determines the distance between the second terminal and the first terminal.

The signal parameter in this embodiment is a parameter related to measurement of the distance between the first terminal and the second terminal, and the signal parameter includes one or more of a signal receiving time and a signal sending time, or received signal power and transmitted signal power.

For details of how the second terminal obtains the signal parameter, refer to the other approaches. The details are not described in this embodiment.

That the second terminal calculates the distance between the second terminal and the first terminal may include that the second terminal determines, according to the signal parameter, that a sending time at which the first terminal sends the first message is t1, the second terminal determines, according to the signal parameter, a signal receiving time t2 at which the second terminal receives the first message, and in this case, the distance between the first terminal and the second terminal is:

$$D=(t2-t1) \times C,$$

where C is a propagation speed of an electromagnetic wave, and generally $C=3\times 10^8$ m/s.

Certainly, the specific manner of determining the distance between the first terminal and the second terminal by the second terminal is used as an example for description and is not limited in this embodiment, provided that the second terminal can determine the distance between the first terminal and the second terminal.

For example, the first terminal may send location information of the first terminal to the second terminal.

Further, the first terminal can send the location information of the first terminal to the second terminal based on the BLUETOOTH technology, the WI-FI technology, the IR technology, the ultra-wideband technology, or the like.

The second terminal can determine the distance between the first terminal and the second terminal according to location information of the second terminal and the location information of the first terminal.

The location information may be absolute geographical location information (for example, longitude and latitude information) or relative location coordinate information.

That the second terminal determines, according to the distance between the second terminal and the first terminal, whether the second terminal falls within the controlled range is used as an example for description and is not limited. For another example, alternatively, the first terminal may send a Location Context Identifier (LCI) of the first terminal to the second terminal. If the second terminal determines that an LCI of the second terminal is equal to the LCI of the first terminal, it indicates that the second terminal falls within the controlled range.

In this embodiment, because even during working, the second terminal that falls beyond the controlled range does not cause noise interference to the first terminal, only the second terminal falling within the controlled range needs to proceed with the following steps.

Step 105: The second terminal adjusts a setting of the second terminal according to the interference control parameter.

In this embodiment, the following two conditions need to be simultaneously met so that the second terminal adjusts the setting of the second terminal according to the interference control parameter.

(1) The second terminal supports the interference control (as indicated in step 103).

(2) The second terminal falls within the controlled range (as indicated in step 104).

The following describes, using an example, how the second terminal adjusts the setting of the second terminal according to the interference control parameter, and this is not limited, provided that noise interference caused by the second terminal to the first terminal can be effectively reduced or avoided after the second terminal adjusts the setting of the second terminal according to the interference control parameter.

A first manner of adjusting the setting of the second terminal by the second terminal may be as follows.

The second terminal may adjust the setting of the second terminal according to the interference control parameter when the second terminal supports the interference control, the second terminal falls within the controlled range, and the second terminal is generating a sound.

Further, when the second terminal determines that the second terminal can perform a specific action indicated by the interference control parameter, the second terminal may adjust the setting of the second terminal according to the action.

For example, when the second terminal determines that the second terminal can perform a muting action indicated by the interference control parameter, the second terminal may adjust the setting of the second terminal to mute.

Alternatively, when the second terminal determines that the second terminal can perform multiple actions indicated by the interference control parameter, the second terminal may adjust the setting of the second terminal according to any one of the actions.

For example, when the second terminal determines that the second terminal can perform actions, such as muting, decreasing volume, pausing, and turning off, indicated by the interference control parameter, if the second terminal can select any one of the actions, for example, select the turning off action, the second terminal may adjust the setting of the second terminal to turn off.

Alternatively, when the second terminal determines that the second terminal can perform multiple actions indicated by the interference control parameter, if the second terminal receives a selection instruction of a user, the second terminal may adjust the setting of the second terminal according to an action selected by the user.

For example, when the second terminal determines that the second terminal can perform actions, such as muting, decreasing volume, pausing, and turning off, indicated by the interference control parameter, if the second terminal receives the selection instruction of the user, and the user can enter the selection instruction to instruct the second terminal to select the decreasing volume action, the second terminal may adjust, according to the instruction that is entered by the user and is used for instructing to decrease volume, the setting of the second terminal to decrease volume.

A second manner of adjusting the setting of the second terminal by the second terminal may be as follows.

Optionally, in this setting adjustment manner, the first message further carries an interference control duration parameter.

In this embodiment, if the second terminal does not generate a sound currently, the second terminal may configure the setting of the second terminal according to the interference control duration parameter and the interference control parameter.

For example, the second terminal determines the interference control duration parameter. That the interference control duration parameter is 10 minutes is used as an example in this embodiment.

The second terminal starts a timer, and sets a timing time of the timer equal to the interference control duration parameter. In this embodiment, the timing time of the timer is 10 minutes.

The second terminal determines the adjusted setting of the second terminal according to the interference control parameter. For example, in this embodiment, the second terminal determines, according to the interference control parameter, that the adjusted setting is decrease volume.

If the second terminal does not receive an interference control end command sent by the first terminal, and the second terminal needs to perform work of generating a sound within the timing time of the timer, the second terminal adjusts the setting of the second terminal to decrease volume.

If the timer expires when the second terminal decreases volume, the second terminal restores the original setting of the second terminal.

A third manner of adjusting the setting of the second terminal by the second terminal may be as follows.

Optionally, in this setting adjustment manner, the first message further carries an interference control duration parameter.

In this embodiment, if the second terminal is currently generating a sound, the second terminal may configure the setting of the second terminal according to the interference control duration parameter and the interference control parameter.

Further, the second terminal can configure, according to the interference control duration parameter, duration of performing, by the second terminal, the action indicated by the interference control parameter.

For example, the second terminal determines the interference control duration parameter. That the interference control duration parameter is one minute is used as an example in this embodiment.

The second terminal determines the adjusted setting of the second terminal according to the interference control parameter. For example, in this embodiment, the second terminal determines, according to the interference control parameter, that the adjusted setting is mute.

The second terminal adjusts the setting of the second terminal to mute, starts a timer, and sets a timing time of the timer equal to the interference control duration parameter. In this embodiment, the timing time of the timer is one minute.

The second terminal restores the original setting of the second terminal if the second terminal does not receive an interference control end command sent by the first terminal, and the timing time of the timer exceeds one minute.

When the interference control duration parameter is exceeded, the second terminal does not need to continue the interference control.

In the third manner of adjusting the setting of the second terminal by the second terminal, a specific method for determining the interference control duration parameter by the first terminal is not limited. For example, when determining to execute the audio service, the first terminal estimates a time period for executing the audio service, or estimates a time period required for current execution of the audio service according to a time period for historically executing the audio service by the first terminal.

The first terminal may determine the interference control duration parameter according to an estimation result. For example, if the first terminal estimates that the time period required for the current execution of the audio service is one minute, the first terminal sets the interference control duration parameter to one minute.

Step 106: The first terminal detects displacement of the first terminal when the first terminal executes the audio service, and the first terminal sends a second message to the second terminal when the displacement exceeds a preset threshold.

Further, the first terminal sends the second message using the short-range wireless communications technology.

A manner of detecting the displacement of the first terminal by the first terminal may be as follows.

The first terminal detects the displacement of the first terminal using a built-in inertial sensor.

The inertial sensor may be an accelerometer, a gyroscope, a magnetometer, or the like.

The specific manner of detecting the displacement of the first terminal by the first terminal is not limited in this embodiment. For example, the first terminal further determines the displacement of the first terminal according to a difference between a location of the first terminal before the detection and a location of the first terminal after the detection.

The second message carries an interference control distance threshold parameter and a signal parameter. For detailed description of the interference control distance threshold parameter and the signal parameter, refer to the foregoing step. Details are not described in this step.

A value of the preset threshold is not limited in this embodiment, provided that when the displacement of the first terminal exceeds the preset threshold, the second terminal no longer causes noise interference to the first terminal, and/or a new second terminal that can receive, using the short-range wireless communications technology, the second message sent by the first terminal emerges.

Step 107: The second terminal receives the second message.

Step 108: The second terminal determines, according to an interference control distance threshold parameter and a signal parameter that are carried in the second message, whether the second terminal falls within the controlled range, if yes, performs step 109, and if no, performs step 113.

For detailed description of the second message in this embodiment, refer to the description of the first message in the foregoing step. Details are not described in this embodiment.

For a specific process of determining, by the second terminal according to the second message, whether the second terminal falls within the controlled range in this embodiment, refer to the process of determining, by the second terminal according to the first message, whether the second terminal falls within the controlled range in step 104. Details are not described in this step.

Step 109: The second terminal adjusts the setting of the second terminal according to the interference control parameter.

The second terminal adjusts the setting of the second terminal according to the interference control parameter when the second terminal determines, according to the second message, that the second terminal supports the interference control, and that the second terminal falls within the controlled range.

For a specific process of adjusting the setting of the second terminal by the second terminal according to the second message, refer to the specific process of adjusting the setting of the second terminal by the second terminal according to the first message in step 105. Details are not described in this step.

Step 110: The first terminal sends a third message to the second terminal.

The third message carries an interference control end command.

When the first terminal determines to end the audio service, the first terminal may send the third message to the second terminal using the short-range wireless communications technology.

The third message is used to instruct the second terminal to restore the original setting of the second terminal.

Step 111: The second terminal receives the third message.

Step 112: The second terminal restores the original setting of the second terminal according to the third message.

The second terminal restores the original setting of the second terminal according to the received third message.

Further, the second terminal may continue to play original audio, perform unmuting, increase volume, resume work, or do the like such that the second terminal can restore, according to the third message, the setting of the second terminal to a setting used when no interference control is performed on the second terminal.

Step 113: The second terminal determines whether the setting of the second terminal has been adjusted, if yes, performs step 114, and if no, performs step 115.

Step 114: The second terminal restores the original setting of the second terminal.

If the second terminal determines that the second terminal has adjusted the setting of the second terminal, the second terminal may determine that before the displacement of the first terminal changes, the second terminal is a terminal that has caused noise interference to the first terminal. When the second terminal determines, according to the second message, that the second terminal falls beyond the controlled range, the second terminal does not cause noise interference to the first terminal, and then the second terminal restores the original setting of the second terminal.

Step 115: The second terminal keeps a current working state unchanged.

If the second terminal determines that the second terminal has not adjusted the setting of the second terminal, the second terminal may determine that after the displacement of the first terminal changes, the second terminal is a new terminal that can receive the second message sent by the first terminal using the short-range wireless communications technology. When the second terminal determines, according to the second message, that the second terminal falls beyond the controlled range, the second terminal does not cause noise interference to the first terminal, and the second terminal may keep the current working state unchanged.

In this embodiment, during the interference control performed on the second terminal, the first terminal may send the first message to the second terminal using the short-range wireless communications technology such that the second terminal may adjust the setting of the second terminal according to the interference control parameter carried in the first message. This effectively reduces noise interference caused by the second terminal to the first terminal, and can be implemented easily without complex operations at low costs. During an implementation, volume of the second terminal does not need to be adjusted frequently, power of the second terminal is effectively saved, and a noise reduction effect is good. In addition, in this embodiment, the first terminal can detect the displacement of the first terminal when executing the audio service. When the displacement exceeds the preset threshold, the first terminal sends the second message to the second terminal such that the second terminal determines, according to the second message, whether the second terminal falls within the controlled range. Therefore, in this embodiment, audio interference control performed on different second terminals can be adjusted in a timely manner according to a change in the displacement of the first terminal, and accuracy of interference control for the audio service is improved.

Figure 2A:
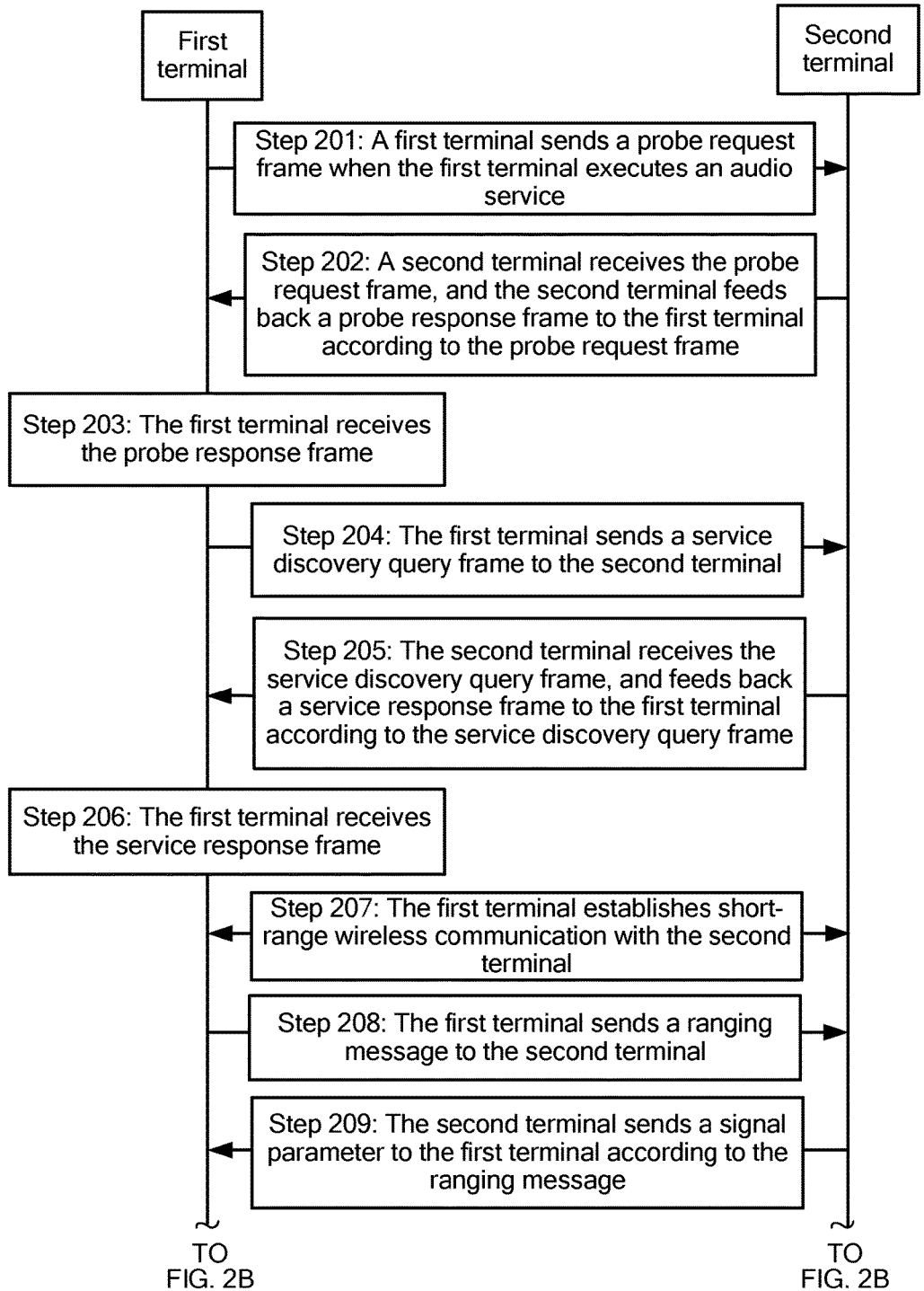
FIG. 2A, FIG. 2B, and FIG. 2C are a step flowchart of another embodiment of a method for controlling interference in an audio service according to an embodiment of the present disclosure.
Figure 2B:
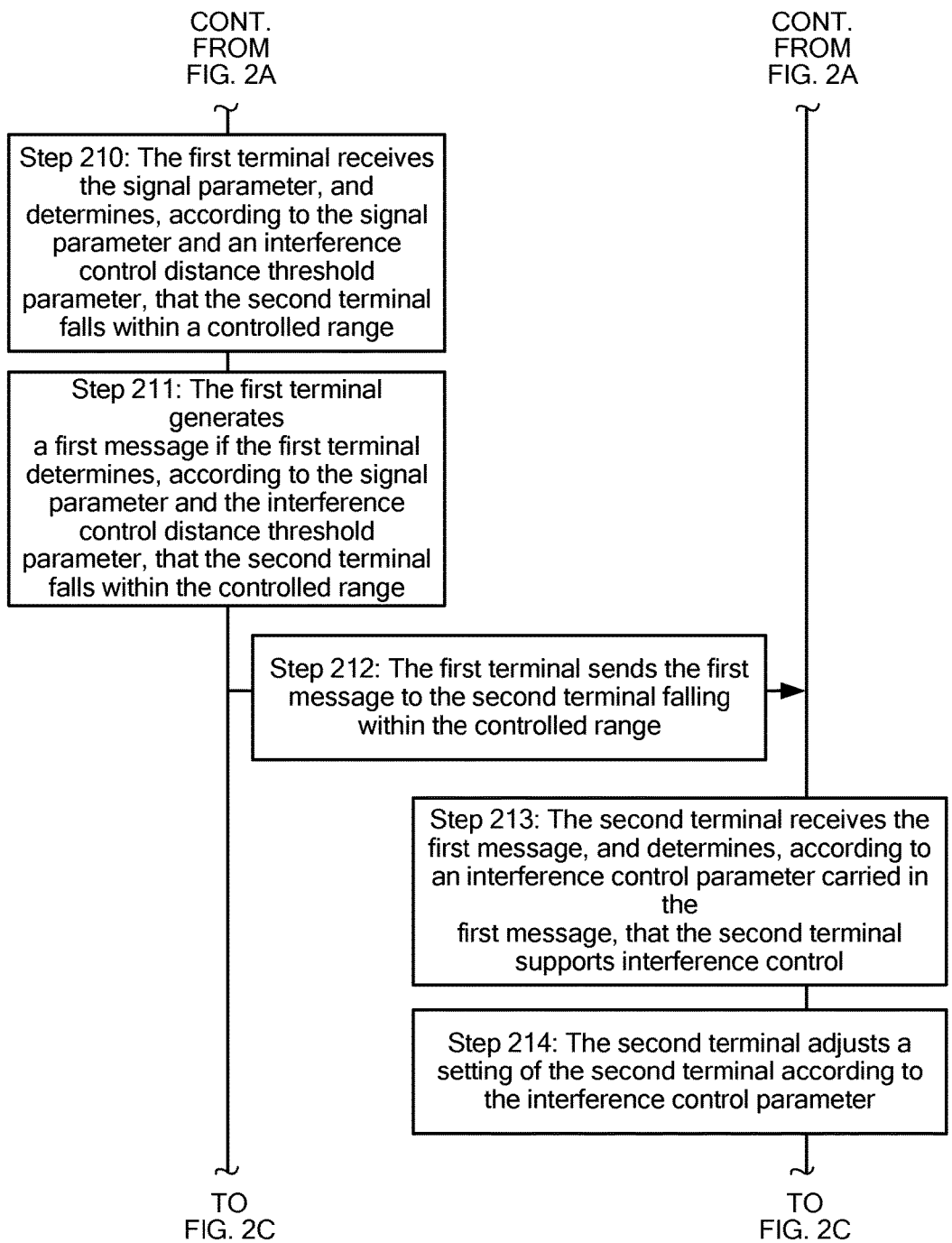
Figure 2C:
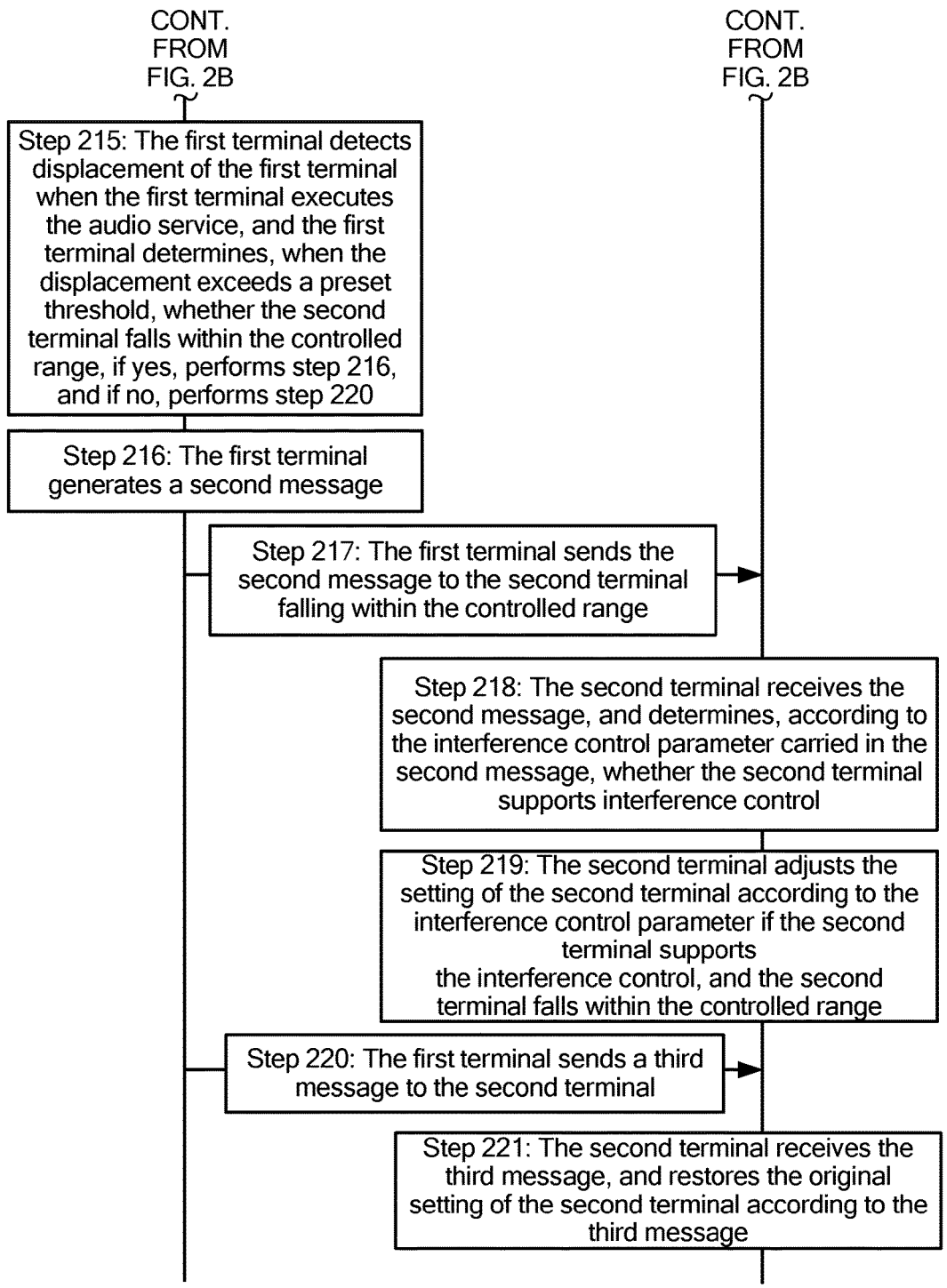

In the method for controlling interference in an audio service shown in FIG. 2A, FIG. 2B, and FIG. 2C, the first terminal does not screen the second terminal. When the first terminal executes the audio service, the first terminal may send, by means of broadcast, the first message for interference control. The following describes, with reference to FIG. 3A and FIG. 3B, how the method for controlling interference in an audio service provided in the embodiments of the present disclosure is implemented when the first terminal screens the second terminal.

Step 201: The first terminal sends a probe request frame when the first terminal executes an audio service.

The first terminal may send the probe request frame when the first terminal executes the audio service.

The first terminal and the second terminal may exchange information based on a BLUETOOTH technology, a WI-FI technology, an IR technology, or an ultra-wideband technology.

Step 202: The second terminal receives the probe request frame, and the second terminal feeds back a probe response frame to the first terminal according to the probe request frame.

Step 203: The first terminal receives the probe response frame.

The first terminal can discover the second terminal according to the probe response frame.

According to step 201 to step 203 in this embodiment, the first terminal can discover the second terminal. It should be noted that step 201 to step 203 for discovering the second terminal in this embodiment are examples for description and are not limited.

Step 204: The first terminal sends a service discovery query frame to the second terminal.

In this embodiment, the first terminal sends the service discovery query frame to the discovered second terminal.

Step 205: The second terminal receives the service discovery query frame, and feeds back a service response frame to the first terminal according to the service discovery query frame.

In this embodiment, the second terminal uses the service response frame to indicate functions and services that are supported by the second terminal.

For example, the second terminal may indicate, using the service response frame, that the second terminal supports functions and services such as muting, decreasing volume, pausing, switching to a headset mode, and turning off.

Step 206: The first terminal receives the service response frame.

The first terminal can determine, according to the service response, the functions and the services that are supported by the second terminal.

For example, the first terminal determines, according to the service response frame, that the second terminal supports the functions and the services such as muting, decreasing volume, pausing, switching to a headset mode, and turning off.

The first terminal may determine, according to the service response frame fed back by the second terminal, a second terminal that meets an interference control requirement of the first terminal.

Step 207: The first terminal establishes short-range wireless communication with the second terminal.

Step 208: The first terminal sends a ranging message to the second terminal.

In this embodiment, the first terminal instructs, using the ranging message, the second terminal to feed back a signal parameter.

Step 209: The second terminal sends a signal parameter to the first terminal according to the ranging message.

The signal parameter in this embodiment is a parameter related to distance measurement, and the signal parameter includes one or more of the following a signal receiving time and a signal sending time, or received signal power and transmitted signal power.

Step 210: The first terminal receives the signal parameter, and determines, according to the signal parameter and an interference control distance threshold parameter, that the second terminal falls within a controlled range.

For detailed description of how the first terminal sets the interference control distance threshold parameter in this embodiment, refer to step 104 shown in FIG. 1A. Details are not described in this embodiment.

In this embodiment, the first terminal can determine, according to a distance between the first terminal and the second terminal, whether the second terminal falls within the controlled range.

If the distance between the second terminal and the first terminal is less than the interference control distance threshold parameter, the first terminal determines that the second terminal falls within the controlled range.

If the distance between the second terminal and the first terminal is greater than or equal to the interference control distance threshold parameter, the first terminal determines that the second terminal falls beyond the controlled range.

In this embodiment, the interference control distance threshold parameter is pre-stored in the first terminal.

For details of how the first terminal determines the distance between the first terminal and the second terminal, refer to the details of how the second terminal determines the distance between the first terminal and the second terminal in step 104 shown in FIG. 1A. The details are not described in this embodiment.

Certainly, the specific manner of determining the distance between the first terminal and the second terminal by the first terminal is used as an example for description and is not limited in this embodiment, provided that the first terminal can determine the distance between the first terminal and the second terminal.

For example, alternatively, the first terminal may request, using the ranging message, the second terminal to feed back location information of the second terminal, and the first terminal can determine the distance between the first terminal and the second terminal according to the location information of the second terminal and location information of the first terminal.

The location information may be absolute geographical location information (for example, longitude and latitude information) or relative location coordinate information.

That the first terminal determines, according to the distance between the second terminal and the first terminal, whether the second terminal falls within the controlled range is used as an example for description and is not limited. For another example, alternatively, the first terminal may request, using the ranging message, the second terminal to feed back an LCI of the second terminal. If the first terminal determines that the LCI of the second terminal is equal to an LCI of the first terminal, it indicates that the second terminal falls within the controlled range.

Step 211: The first terminal generates a first message if the first terminal determines, according to the signal parameter and the interference control distance threshold parameter, that the second terminal falls within the controlled range.

The first message carries an interference control parameter.

Step 212: The first terminal sends the first message to the second terminal falling within the controlled range.

Step 213: The second terminal receives the first message, and determines, according to the interference control parameter carried in the first message, that the second terminal supports interference control.

For a specific process of determining, by the second terminal according to the interference control parameter, whether the second terminal supports the interference control in this step, refer to step 103 shown in FIG. 1A. Details are not described in this embodiment.

Step 214: The second terminal adjusts a setting of the second terminal according to the interference control parameter.

For a specific implementation process of step 214 in this embodiment, refer to step 105 shown in FIG. 1A. Details are not described in this embodiment again.

Step 215: The first terminal detects displacement of the first terminal when the first terminal executes the audio service, and the first terminal determines, when the displacement exceeds a preset threshold, whether the second terminal falls within the controlled range, if yes, performs step 216, and if no, performs step 220.

Step 216: The first terminal generates a second message.

The first terminal detects the displacement of the first terminal when the first terminal executes the audio service. When the displacement exceeds the preset threshold, the first terminal on which a displacement movement occurs determines whether the second terminal falls within the controlled range.

If the first terminal on which the displacement movement occurs determines a second terminal falling within the controlled range, the first terminal sends, to the second terminal, the second message carrying an interference control distance threshold parameter and a signal parameter, and proceeds with step 217.

For a specific process of determining, by the first terminal on which the displacement movement occurs, the second terminal falling within the controlled range, refer to step 201 to step 210. Details are not described in this step.

For a specific process of detecting the displacement of the first terminal by the first terminal, refer to step 106 shown in FIG. 1A. Details are not described in this embodiment.

Step 217: The first terminal sends the second message to the second terminal falling within the controlled range.

Step 218: The second terminal receives the second message, and determines, according to the interference control parameter carried in the second message, whether the second terminal supports interference control.

For a specific process of determining, by the second terminal according to the second message, whether the second terminal supports the interference control, refer to how the second terminal determines, according to the first message, whether the second terminal supports the interference control in step 213 shown in FIG. 2B. The specific process is not described herein again.

Step 219: The second terminal adjusts the setting of the second terminal according to the interference control parameter if the second terminal supports the interference control, and the second terminal falls within the controlled range.

For a detailed process of adjusting the setting of the second terminal by the second terminal according to the second message in this step, refer to the process of adjusting the setting of the second terminal by the second terminal according to the first message in step 214 shown in FIG. 2B. The specific process is not described herein again.

Step 220: The first terminal sends a third message to the second terminal.

In this embodiment, the first terminal sends the third message to the second terminal in the following two cases.

In one case, when the displacement of the first terminal exceeds the preset threshold, and the first terminal determines that the second terminal no longer falls within the controlled range in step 215, the first terminal sends the third message to the second terminal that no longer falls within the controlled range.

Further, if the first terminal determines that the distance between the second terminal and the first terminal is greater than or equal to the interference control distance threshold parameter, the first terminal determines that the second terminal falls beyond the controlled range. Alternatively, if the first terminal determines that the LCI of the first terminal is different from the LCI of the second terminal, the first terminal determines that the second terminal falls beyond the controlled range. In this case, the first terminal sends the third message to the second terminal.

In the other case, after the second terminal adjusts the setting of the second terminal according to the second message when performing the process in step 219, and when the first terminal determines to stop executing the audio service, the first terminal does not need to perform interference control on the second terminal, and the first terminal sends the third message to the second terminal.

The third message carries an interference control end command.

When the first terminal determines to end the audio service, the first terminal may send the third message to the second terminal using a short-range wireless communications technology.

The third message is used to instruct the second terminal to restore the original setting of the second terminal.

Step 221: The second terminal receives the third message, and restores the original setting of the second terminal according to the third message.

The second terminal restores the original setting of the second terminal according to the received third message.

The second terminal may continue to play original audio, perform unmuting, increase volume, resume work, or do the like.

In this embodiment, during the interference control performed on the second terminal, the first terminal may send, using the short-range wireless communications technology, the first message to the second terminal falling within the controlled range such that the second terminal may adjust the setting of the second terminal according to the interference control parameter carried in the first message. This effectively reduces noise interference caused by the second terminal to the first terminal, and can be implemented easily without complex operations at low costs. During an implementation, volume of the second terminal does not need to be adjusted frequently, power of the second terminal is effectively saved, and a noise reduction effect is good. In addition, in this embodiment, the first terminal can detect the displacement of the first terminal when executing the audio service. When the displacement exceeds the preset threshold, the first terminal sends the second message to the second terminal such that the second terminal adjusts the setting of the second terminal according to the interference control parameter. Therefore, in this embodiment, audio interference control performed on different second terminals can be adjusted in a timely manner according to a change in the displacement of the first terminal, and accuracy of interference control for the audio service is improved.

In the embodiments shown in FIG. 1A and FIG. 1B, and FIG. 2A, FIG. 2B, and FIG. 2C, the first terminal discovers, by exchanging information with the second terminal, the second terminal that can cause noise interference to the first terminal. For details, refer to FIG. 1A and FIG. 1B, and FIG. 2A, FIG. 2B, and FIG. 2C. Details are not described in this embodiment.

Certainly, in the embodiments shown in FIG. 1A and FIG. 1B, and FIG. 2A, FIG. 2B, and FIG. 2C, the manner of discovering the second terminal by the first terminal is only an optional example and is not limited.

For example, the first terminal executing the audio service may detect a surrounding noise status, and determine volume of surrounding noise.

The first terminal may preset a noise threshold. If the first terminal determines that the detected volume of the surrounding noise is greater than or equal to the noise threshold, the first terminal may determine that there is a second terminal that may cause noise interference to the first terminal around the first terminal, and then the first terminal may perform interference control on the second terminal. For a specific manner of performing interference control on the second terminal by the first terminal, refer to the embodiments shown in FIG. 1A and FIG. 1B, and FIG. 2A, FIG. 2B, and FIG. 2C. Details are not described in this embodiment.

In FIG. 1A and FIG. 1B, and FIG. 2A, FIG. 2B, and FIG. 2C, the methods for controlling interference in an audio service provided in the embodiments of the present disclosure are described from an interaction perspective. The following describes a method for controlling interference in an audio service provided in an embodiment of the present disclosure in detail with reference to FIG. 3A and FIG. 3B from a perspective of a terminal that can cause noise interference to another terminal executing an audio service.

Step 301: A terminal receives a first message using a short-range wireless communications technology.

The terminal receives the first message sent by another terminal that is executing an audio service.

The terminal is not limited in this embodiment, provided that a sound generated by the terminal can cause interference to the other terminal that is executing the audio service.

For example, the terminal may be a television, a washing machine, a vacuum cleaner, a smartphone, a tablet computer, or an in-vehicle terminal.

For detailed description of the short-range wireless communications technology, refer to step 101 shown in FIG. 1A. Details are not described in this embodiment.

The first message carries an interference control parameter.

For a specific process of receiving the first message by the terminal in step 301 in this embodiment, refer to the specific process of receiving the first message by the second terminal in step 102 shown in FIG. 1A. Details are not described herein again.

Step 302: The terminal determines, according to the interference control parameter carried in the first message, that the terminal supports interference control.

For a specific process of determining, by the terminal according to the first message, whether the terminal supports the interference control in this embodiment, refer to the specific process of determining, by the second terminal according to the first message, that the second terminal supports the interference control in step 103 shown in FIG. 1A. Details are not described in this embodiment.

The interference control parameter in this embodiment may be optionally one or more of muting, decreasing volume, pausing, switching to a headset mode, turning off, or the like.

The interference control parameter is not limited in this embodiment, provided that noise interference caused by the terminal to the other terminal that is executing the audio service can be avoided or reduced when the terminal performs an action indicated by the interference control parameter.

If the terminal determines that the terminal can perform the action indicated by the interference control parameter, the terminal determines that the terminal supports the interference control.

If the terminal determines that the terminal cannot perform the action indicated by the interference control parameter, the terminal determines that the terminal does not support the interference control.

Step 303: The terminal determines, according to the first message, that the terminal falls within a controlled range.

For a specific process of determining, by the terminal according to the first message, that the terminal falls within the controlled range, refer to the structural process of determining, by the second terminal according to the first message, that the second terminal falls within the controlled range in step 104 shown in FIG. 1A. Details are not described in this embodiment.

Step 304: The terminal adjusts a setting of the terminal according to the interference control parameter.

For a specific process of adjusting the setting of the terminal by the terminal according to the interference control parameter, refer to the specific process of adjusting the setting of the second terminal by the second terminal according to the interference control parameter in step 105 shown in FIG. 1A. Details are not described in this embodiment.

Step 305: The terminal receives a second message.

Further, the other terminal detects displacement of the other terminal when executing the audio service, and the other terminal sends the second message to the terminal when the displacement of the other terminal exceeds a preset threshold.

For a detailed process of sending the second message by the other terminal in this embodiment, refer to the process of sending the second message by the first terminal in step 106 shown in FIG. 1A. Details are not described in this embodiment.

Step 306: The terminal determines, according to an interference control distance threshold parameter and a signal parameter that are carried in the second message, whether the terminal falls within the controlled range, if yes, performs step 307, and if no, performs step 309.

For a specific process of determining, by the terminal according to the second message, whether the terminal falls within the controlled range in this embodiment, refer to the specific process of determining, by the second terminal according to the interference control distance threshold parameter and the signal parameter that are carried in the second message, whether the second terminal falls within the controlled range in step 108 shown in FIG. 1B. Details are not described in this step.

Step 307: The terminal adjusts the setting of the terminal according to the interference control parameter if the terminal supports the interference control, and the terminal falls within the controlled range.

For a specific process of adjusting the setting of the terminal by the terminal according to the second message, refer to the specific process of adjusting the setting of the terminal by the terminal according to the first message in step 304. Details are not described in this step.

Step 308: The terminal receives a third message, and restores the original setting of the terminal according to the third message.

The third message carries an interference control end command.

When determining that the audio service needs to be ended, the other terminal may send the third message to the terminal using the short-range wireless communications technology.

The third message is used to instruct the terminal to restore the original setting of the terminal.

The terminal restores the original setting of the terminal according to the received third message.

Further, the terminal may continue to play original audio, perform unmuting, increase volume, resume work, or do the like such that the terminal can restore, according to the third message, the setting of the terminal to a setting used when no interference control is performed on the terminal.

Step 309: The terminal determines whether the setting of the terminal has been adjusted, if yes, performs step 310, and if no, performs step 311.

For a specific process of determining, by the terminal, whether the setting of the terminal has been adjusted, refer to the specific process of determining, by the second terminal, whether the setting of the second terminal has been adjusted in step 113 in the embodiment shown in FIG. 1B. Details are not described in this embodiment.

Step 310: The terminal restores the original setting of the terminal.

For a specific process of restoring the original setting of the terminal by the terminal, refer to the specific process of restoring the original setting of the second terminal by the second terminal in step 114 in the embodiment shown in FIG. 1B. Details are not described in this embodiment.

Step 311: The terminal keeps a current working state unchanged.

For a specific process of keeping the current working state unchanged by the terminal, refer to the specific process of keeping the current working state unchanged by the second terminal in step 115 in the embodiment shown in FIG. 1B. Details are not described in this embodiment.

In this embodiment, during the interference control performed on the terminal, the other terminal that is executing the audio service may send the first message to the terminal using the short-range wireless communications technology such that the terminal may adjust the setting of the terminal according to the interference control parameter carried in the first message. This effectively reduces noise interference caused by the terminal to the other terminal that is executing the audio service, and can be implemented easily without complex operations at low costs. During an implementation, volume of the terminal does not need to be adjusted frequently, power of the terminal is effectively saved, and a noise reduction effect is good. In addition, in this embodiment, the other terminal that is executing the audio service sends the second message to the terminal when the displacement of the other terminal exceeds the preset threshold during execution of the audio service such that the terminal determines, according to the second message, whether the terminal falls within the controlled range. Therefore, in this embodiment, interference control for the audio service can be adjusted in a timely manner according to a change in the displacement of the other terminal that is executing the audio service, and accuracy of the interference control for the audio service is improved.

Figure 4A:
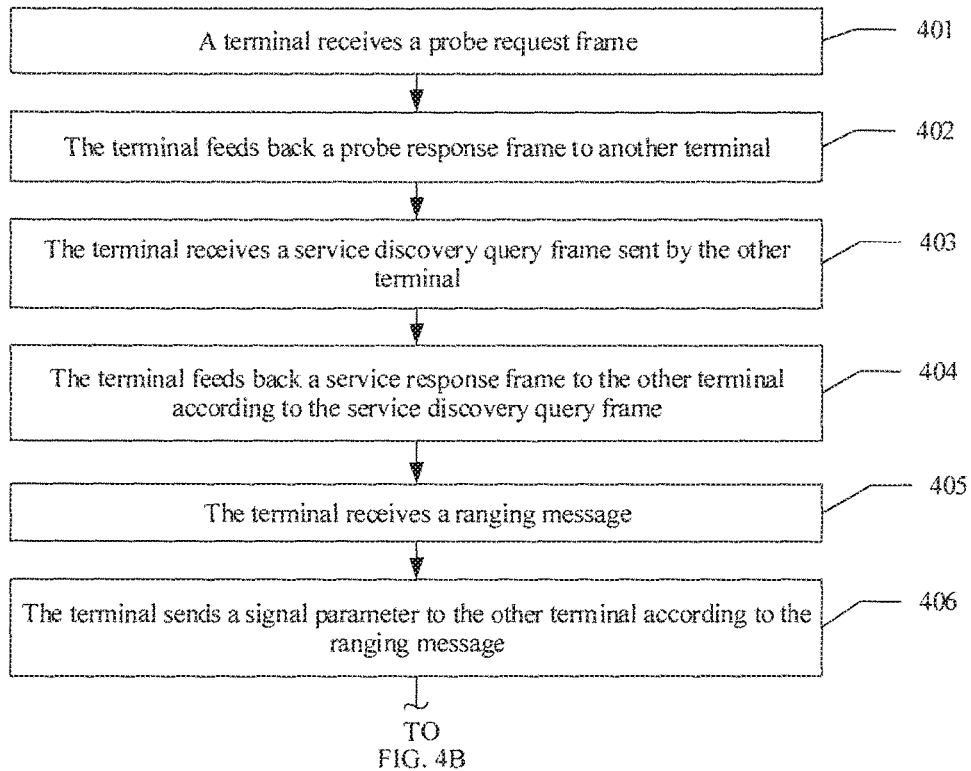
FIG. 4A and FIG. 4B are a step flowchart of another embodiment of a method for controlling interference in an audio service according to an embodiment of the present disclosure.
Figure 4B:
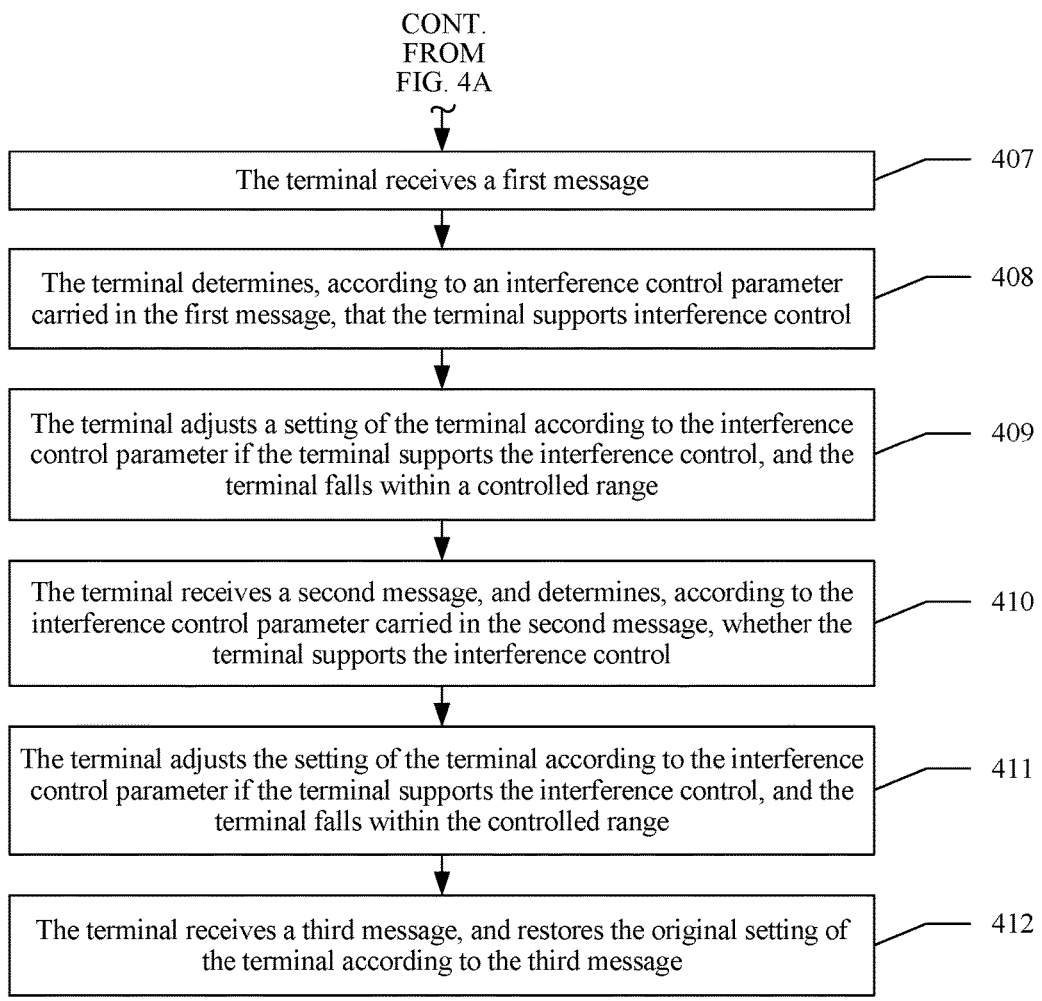

The following describes, with reference to FIG. 4A and FIG. 4B, how the method for controlling interference in an audio service provided in the embodiments of the present disclosure is implemented if it is determined, by the other terminal that is executing the audio service, that the terminal falls within the controlled range.

Step 401: The terminal receives a probe request frame.

The terminal receives the probe request frame sent by the other terminal that is executing the audio service.

Step 402: The terminal feeds back a probe response frame to the other terminal.

The terminal can discover, according to the probe request frame, the other terminal that is executing the audio service.

Step 403: The terminal receives a service discovery query frame sent by the other terminal.

Step 404: The terminal feeds back a service response frame to the other terminal according to the service discovery query frame.

In this embodiment, the terminal indicates, using the service response frame, functions and services that are supported by the terminal.

For example, the terminal may indicate, using the service response frame, that the terminal supports functions and services such as muting, decreasing volume, pausing, switching to a headset mode, and turning off.

Step 405: The terminal receives a ranging message.

The other terminal may send the ranging message to the terminal after the other terminal receives the fed back service response frame.

Step 406: The terminal sends a signal parameter to the other terminal according to the ranging message.

The signal parameter in this embodiment is a parameter related to distance measurement, and the signal parameter includes one or more of a signal receiving time and a signal sending time, or received signal power and transmitted signal power.

The other terminal that is executing the audio service may determine a distance between the other terminal and the terminal according to the signal parameter.

For a specific process of determining the distance between the other terminal and the terminal by the other terminal according to the signal parameter in this embodiment, refer to the specific process of calculating the distance between the second terminal and the first terminal by the first terminal in step 210 shown in FIG. 2B. Details are not described in this embodiment.

Certainly, that the other terminal determines the distance between the other terminal and the terminal according to the signal parameter sent by the terminal is used as an example for description and is not limited.

For example, alternatively, the other terminal may request, using the ranging message, the terminal to feed back location information.

The other terminal may determine the distance between the other terminal and the terminal according to the location information of the terminal and location information of the other terminal.

The location information may be absolute geographical location information (for example, longitude and latitude information) or relative location coordinate information.

The other terminal may determine, according to the distance between the other terminal and the terminal, the terminal falling within a controlled range.

Step 407: The terminal receives a first message.

In this embodiment, the other terminal sends, using the short-range wireless communications technology, the first message to the terminal falling within the controlled range.

A size of the controlled range is not limited in this embodiment, provided that the terminal falling within the controlled range can cause noise interference to the other terminal that is executing the audio service.

For a specific process of determining, by the other terminal, the terminal falling within the controlled range, refer to the specific process of determining, by the first terminal according to the distance between the first terminal and the second terminal, the second terminal falling within the controlled range in step 210 shown in FIG. 2B. Details are not described in this embodiment.

Step 408: The terminal determines, according to the interference control parameter carried in the first message, that the terminal supports interference control.

For a specific process of determining, by the terminal according to the interference control parameter, whether the terminal supports the interference control in this step, refer to the specific process of determining, by the second terminal according to the interference control parameter carried in the first message, that the second terminal supports the interference control in step 213 shown in FIG. 2B. Details are not described in this embodiment.

Step 409: The terminal adjusts a setting of the terminal according to the interference control parameter if the terminal supports the interference control, and the terminal falls within a controlled range.

For a specific process of adjusting the setting of the terminal by the terminal according to the interference control parameter in this embodiment, refer to the specific process of adjusting the setting of the second terminal by the second terminal according to the interference control parameter in step 214 shown in FIG. 2B. Details are not described in this embodiment.

Step 410: The terminal receives a second message, and determines, according to the interference control parameter carried in the second message, whether the terminal supports the interference control.

For a specific process of sending the second message by the other terminal that is executing the audio service in this embodiment, refer to the specific process of sending the second message by the first terminal in step 215 to step 217 shown in FIG. 3. Details are not described in this embodiment.

For a specific process of determining, by the terminal according to the second message, whether the terminal supports the interference control, refer to how the terminal determines, according to the first message, whether the terminal supports the interference control in step 408 shown in FIG. 4B. The specific process is not described herein again.

Step 411: The terminal adjusts the setting of the terminal according to the interference control parameter if the terminal supports the interference control, and the terminal falls within the controlled range.

For details of a process of adjusting the setting of the terminal by the terminal according to the second message in this step, refer to the process of adjusting the setting of the terminal by the terminal according to the first message in step 409 shown in FIG. 4B. The specific process is not described herein again.

Step 412: The terminal receives a third message, and restores the original setting of the terminal according to the third message.

The third message carries an interference control end command.

For details of a specific case in which the other terminal that is executing the audio service sends the third message, refer to the cases in which the first terminal sends the third message to the second terminal in step 220 shown in FIG. 2C. Details are not described in this embodiment.

The other terminal may send the third message to the terminal using the short-range wireless communications technology when determining to end the audio service.

The third message is used to instruct the terminal to restore the original setting of the terminal.

The terminal restores the original setting of the terminal according to the received third message.

Further, the terminal may continue to play original audio, perform unmuting, increase volume, resume work, or do the like.

In this embodiment, during the interference control performed on the terminal, the other terminal may send, using the short-range wireless communications technology, the first message to the terminal falling within the controlled range such that the terminal may adjust the setting of the terminal according to the interference control parameter carried in the first message. This effectively reduces noise interference caused by the terminal to the other terminal, and can be implemented easily without complex operations at low costs. During an implementation, volume of the terminal does not need to be adjusted frequently, power of the terminal is effectively saved, and a noise reduction effect is good. In addition, in this embodiment, the other terminal can detect displacement of the other terminal when executing the audio service. When the displacement exceeds a preset threshold, the other terminal sends the second message and the third message to the terminal such that the terminal determines, according to the second message, whether the terminal falls within the controlled range, and the terminal restores the original setting of the terminal according to the third message. Therefore, in this embodiment, interference control for the audio service can be adjusted in a timely manner according to a change in the displacement of the other terminal, and accuracy of the interference control for the audio service is improved.

Figure 5:
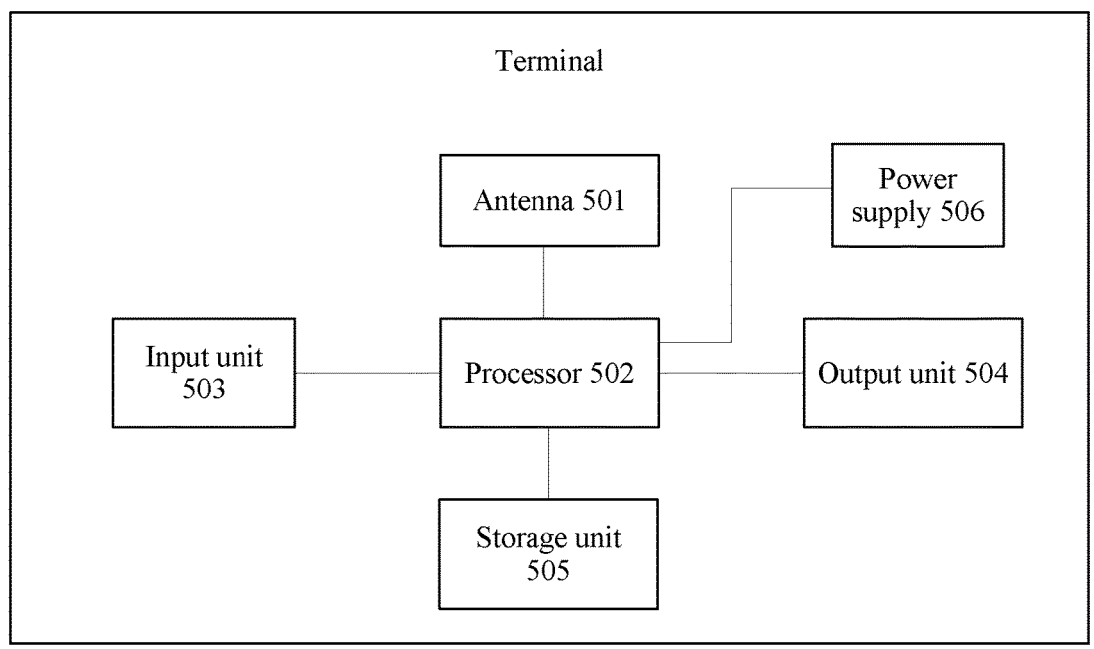
FIG. 5 is a schematic structural diagram of an embodiment of a terminal according to an embodiment of the present disclosure.

The following describes a structure of a terminal provided in an embodiment of the present disclosure in detail with reference to FIG. 5.

The terminal includes an antenna 501 and a processor 502.

The terminal further includes parts such as an input unit 503, an output unit 504, a storage unit 505, and a power supply 506.

These parts communicate with each other using one or more buses. Persons skilled in the art may understand that the structure of the terminal shown in the figure imposes no limitation on the present disclosure. The structure may be a bus structure or a star structure, and may include more or fewer parts than those shown in the figure, or combine some parts, or have different part arrangements.

The input unit 503 is configured to implement interaction between a user and the terminal and/or input information to the terminal.

For example, the input unit 503 may receive digit or character information entered by the user, and the input unit 503 may receive a pressing operation or the like entered by the user such that the input unit 503 generates signal input related to user settings or function control.

In a specific implementation of the present disclosure, the input unit 503 may be a touch panel, or may be another human-machine interaction interface such as a substantive input key and a microphone, or may be another apparatus for obtaining external information such as a camera.

The touch panel is also referred to as a touchscreen. For example, the user performs an action on the touch panel or at a location near the touch panel using a finger, a stylus, or any suitable object or accessory, and a corresponding connected apparatus is driven according to a preset program.

Optionally, the touch panel may include two parts a touch detection apparatus and a touch controller.

The touch detection apparatus detects a touch operation of the user, converts the detected touch operation into an electrical signal, and transmits the electrical signal to the touch controller. The touch controller receives the electrical signal from the touch detection apparatus, converts the electrical signal into touch point coordinates, and then sends the touch point coordinates to the processor 502.

The touch controller may further receive and execute a command sent by the processor 502.

In addition, the touch panel may be implemented in multiple types such as a resistive type, a capacitive type, infrared, and a surface acoustic wave.

In another implementation of the present disclosure, a substantive input key used as the input unit 503 may include but is not limited to one or more of a physical keyboard, a function key (such as a volume control key and a power on-off key), a trackball, a mouse, or a joystick. The input unit 503 in a microphone form may collect a voice input by the user or an environment, and convert the voice into a command that is in an electrical signal form and can be executed by the processor 502.

In some other implementations of the present disclosure, the input unit 503 may be various sensing components, for example, a Hall component configured to detect a physical quantity of the terminal, such as force, torque, pressure, stress, a location, displacement, a speed, an acceleration, an angle, an angular velocity, a quantity of revolutions, a rotational speed, and a time point at which a working state changes, and covert the physical quantity into a quantity of electricity to perform detection and control.

Some other sensing components may include a gravity sensor, a tri-axis accelerometer, a gyroscope, an electronic compass, an ambient light sensor, a proximity sensor, a temperature sensor, a humidity sensor, a pressure sensor, a heart rate sensor, a fingerprint sensor, and the like.

The processor 502 is a control center of the terminal, is connected to each part of the entire terminal using various interfaces and lines, and performs various functions of the terminal and/or processes data by running or executing a software program and/or a module stored in the storage unit and by invoking data stored in the storage unit. The processor 502 may include an IC, for example, may include a singly-encapsulated IC, or may include multiple connected encapsulated ICs with a same function or different functions.

For example, the processor 502 may include only a central processing unit (CPU), or may be a combination of a graphical processing unit (GPU), a digital signal processor (DSP), and a control chip (such as a baseband chip) in a communications unit.

In an implementation of the present disclosure, the CPU may be a single computing core, or may include multiple computing cores.

The antenna 501 is configured to establish a communication channel.

The output unit 504 is optionally configured to output an image and/or a sound.

If the output unit 504 can output an image, the output image may be a text, a picture, and/or a video.

The output unit 504 may include a display panel, such as a display panel disposed in a form of a liquid crystal display (LCD), an organic light-emitting diode (OLED), a field emission display (FED), or the like.

Alternatively, the output unit 504 may include a reflective display, such as an electrophoretic display or a display utilizing a technology of interferometric modulation of light.

The output unit 504 may include a single display or multiple displays of different sizes.

In a specific implementation of the present disclosure, the touch panel used by the input unit 503 may also be used as a display panel of the output unit.

For example, after the touch panel detects a gesture operation of touching or approaching on the touch panel, the touch panel transmits the gesture operation to the processor 502 to determine a type of a touch event. Then the processor 502 provides corresponding visual output on the display panel according to the type of touch event.

In FIG. 5, the input unit 503 and the output unit 504 are used as two independent parts to implement input and output functions of the terminal. However, in some embodiments, the touch panel and the display panel may be integrated to implement the input and output functions of the terminal.

For example, the output unit 504 may display various graphical user interfaces (GUI) as virtual control parts, including but not limited to a window, a scroll bar, an icon, and a clipboard such that the user performs an operation in a touch manner.

In a specific implementation of the present disclosure, the output unit 504 includes a filter and an amplifier that are configured to filter and amplify a video output by the processor 502. The output unit 504 further includes a digital-to-analog converter configured to convert an audio signal output by the processor 502 from a digital format to an analog format.

The storage unit 505 may be configured to store the software program and the module. The processor 502 performs various functional applications of the terminal and processes data by running the software program and the module that are stored in the storage unit 505.

The storage unit 505 mainly includes a program storage area and a digital storage area.

The program storage area may store an operating system and an application program required by at least one function, for example, a sound playing program and an image playing program. The data storage area may store data (such as audio data and an address book) created according to use of the terminal, and the like.

In a specific implementation of the present disclosure, the storage unit 505 may include a nonvolatile dynamic random access memory (NVRAM), a phase change random access memory (PRAM), and a magneto-resistive random access memory (MRAM), or may include a nonvolatile memory, such as at least one disk storage component, electrically erasable programmable read-only memory (EEPROM for short), and flash memory component such as an NOR flash memory or an NAND flash memory.

The nonvolatile memory stores an operating system and an application program that are executed by the processor 502. The processor 502 loads a running program and data from the nonvolatile memory to a memory, and stores digital content in a massive storage apparatus. The operating system includes various parts and/or drivers that are used to control and manage conventional system tasks, such as memory management, storage device control, and power management, and that facilitate communication between various types of software and hardware. In an implementation of the present disclosure, the operating system may be an ANDROID system of GOOGLE Inc., an IOS system developed by APPLE Inc., a WINDOWS operating system developed by MICROSOFT Corporation, or an embedded operating system such as VXWORKS.

The application program includes any application installed on the terminal, and includes but is not limited to a browser, an e-mail, an instant messaging service, word processing, a virtual keyboard, a widget, encryption, digital rights management, speech recognition, speech reproduction, positioning (for example, a function provided by the Global Positioning System), and music play.

The power supply 506 is configured to supply power to different parts of the terminal to maintain running of the parts. Generally, the power supply 506 may be a built-in battery such as a common lithium-ion battery and a nickel metal hydride (NiMH) battery, and also includes an external power supply 506 such as an alternating current (AC) adapter that directly supplies power to the terminal.

In some implementations of the present disclosure, the power supply 506 may further have a wider definition, for example, may further include a power supply 506 management system, a charging system, a power supply 506 fault detection circuit, a power supply 506 converter or inverter, a power supply 506 status indicator (such as a light-emitting diode), and any other parts associated with power generation, management, and distribution of the terminal.

The following describes specific functions of the antenna 501 and the processor 502 when the terminal provided in this embodiment of the present disclosure is applied to perform interference control.

The terminal in this embodiment is an interfering terminal that can cause noise interference to another terminal executing an audio service.

The antenna 501 is configured to receive a first message.

Further, the terminal receives, using the antenna 501, the first message sent by another terminal that is executing an audio service.

The first message carries an interference control parameter.

The processor 502 is configured to adjust a setting of the terminal according to the interference control parameter when the processor determines, according to the interference control parameter, that the terminal supports interference control, and that the terminal falls within a controlled range in order to reduce or avoid noise interference caused, to the terminal sending the first message, by the terminal that has adjusted the setting of the terminal.

For a specific process of determining, by the processor 502 according to the first message, whether the terminal supports the interference control in this embodiment, refer to the specific process of determining, by the second terminal according to the interference control parameter carried in the first message, that the second terminal supports the interference control in step 103 shown in FIG. 1A. Details are not described in this embodiment.

Further, the interference control parameter in this embodiment may be optionally one or more of muting, decreasing volume, pausing, switching to a headset mode, turning off, or the like.

The interference control parameter is not limited in this embodiment, provided that noise interference caused by the terminal to the other terminal that is executing the audio service can be avoided or reduced when the terminal performs an action indicated by the interference control parameter.

Further, if the processor 502 determines that the terminal can perform the action indicated by the interference control parameter, the processor 502 determines that the terminal supports the interference control.

If the processor 502 determines that the terminal cannot perform the action indicated by the interference control parameter, the processor 502 determines that the terminal does not support the interference control.

The processor 502 is further configured to adjust the setting of the terminal according to the interference control parameter if the terminal supports the interference control, and the terminal falls within the controlled range.

In this embodiment, the following two conditions need to be simultaneously met so that the processor 502 adjusts the setting of the terminal according to the interference control parameter.

(1) The terminal supports the interference control.
(2) The terminal falls within the controlled range.

For a specific process of adjusting the setting of the terminal by the processor 502 according to the interference control parameter, refer to the specific process of adjusting the setting of the second terminal by the second terminal according to the interference control parameter in step 105 shown in FIG. 1A. Details are not described in this embodiment.

In this embodiment, during the interference control performed on the terminal, the other terminal that is executing the audio service may send the first message to the terminal using a short-range wireless communications technology such that the terminal may adjust the setting of the terminal according to the interference control parameter when the terminal supports the interference control, and the terminal falls within the controlled range. This effectively reduces noise interference caused by the terminal to the other terminal that is executing the audio service, and can be implemented easily without complex operations at low costs. In addition, during an implementation, volume of the terminal does not need to be adjusted frequently, power of the terminal is effectively saved, and a noise reduction effect is good.

Optionally, if the processor 502 determines whether the terminal falls within the controlled range, the first message further carries an interference control distance threshold parameter and a signal parameter, and the processor 502 is further configured to determine, according to the interference control distance threshold parameter and the signal parameter that are carried in the first message, whether the terminal falls within the controlled range.

The signal parameter is a parameter related to distance measurement, and the signal parameter includes one or more of a signal receiving time and a signal sending time, or received signal power and transmitted signal power.

Figure 3A:
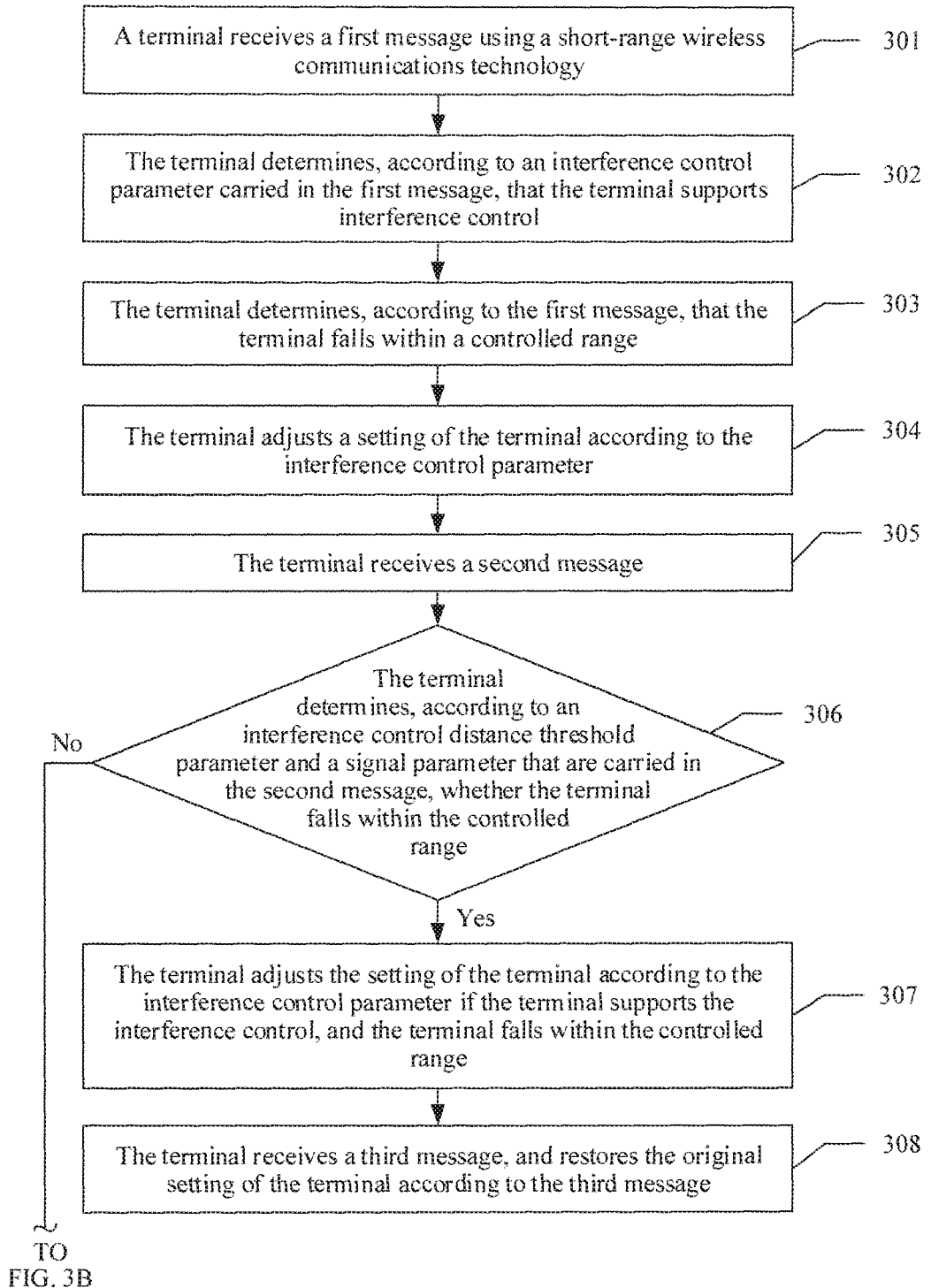
FIG. 3A and FIG. 3B are a step flowchart of an embodiment of a method for controlling interference in an audio service according to an embodiment of the present disclosure.
Figure 3B:
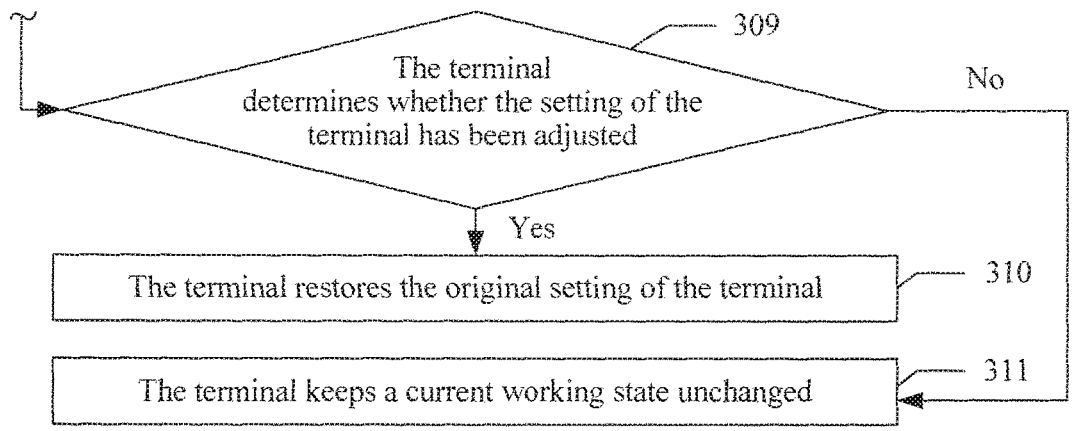

For a specific process of determining, by the processor 502 according to the interference control distance threshold parameter and the signal parameter that are carried in the first message, whether the terminal falls within the controlled range, refer to the specific process of determining, by the terminal according to the first message, whether the terminal falls within the controlled range in step 303 shown in FIG. 3A. Details are not described in this embodiment.

For a specific process of determining, by the other terminal, the terminal falling within the controlled range, refer to the specific process of determining, by the first terminal according to the distance between the first terminal and the second terminal, the second terminal falling within the controlled range in step 211 shown in FIG. 2B. Details are not described in this embodiment.

The processor 502 is further configured to adjust the setting of the terminal according to the interference control parameter when the terminal supports the interference control, the terminal falls within the controlled range, and the terminal is generating a sound.

For a specific process of adjusting the setting of the terminal by the processor 502 according to the interference control parameter in this embodiment, refer to the specific process of adjusting the setting of the second terminal by the second terminal according to the interference control parameter in step 105 shown in FIG. 1A. Details are not described in this embodiment again.

The first message further carries an interference control duration parameter, and the processor 502 is further configured to configure, by the terminal, the setting of the terminal according to the interference control duration parameter and the interference control parameter when the terminal supports the interference control, and the terminal falls within the controlled range.

For a specific process of adjusting the setting of the terminal by the terminal according to the interference control duration parameter in this embodiment, refer to the specific process of adjusting the setting of the second terminal by the second terminal according to the interference control parameter in step 105 shown in FIG. 1A. Details are not described in this embodiment again.

The antenna 501 is further configured to receive a fourth message.

For detailed description of the fourth message in this embodiment, refer to the description of the second message received by the second terminal in the embodiment shown in FIG. 1A and FIG. 1B. Details are not described in this embodiment again.

That is, the processor 502 can determine, according to the fourth message, that displacement of the terminal that is executing the audio service moves, and the displacement exceeds a preset threshold.

The processor 502 is further configured to determine, according to an interference control distance threshold parameter and a signal parameter that are carried in the fourth message, whether the terminal falls within the controlled range.

For a specific process of determining, by the processor 502 according to the fourth message, whether the terminal falls within the controlled range in this embodiment, refer to the specific process of determining, by the second terminal according to the interference control distance threshold parameter and the signal parameter that are carried in the second message, whether the second terminal falls within the controlled range in step 108 shown in FIG. 1B. Details are not described in this embodiment.

The processor 502 is further configured to restore, by the terminal, the original setting of the terminal if the terminal falls beyond the controlled range.

For a specific process of controlling, by the processor 502, the terminal to restore the original setting of the terminal in this embodiment, refer to the specific process of restoring the original setting of the second terminal by the second terminal in step 211 shown in FIG. 2B. Details are not described in this embodiment.

Optionally, the terminal in this embodiment may be a terminal that is executing an audio service. In order that the terminal that is executing the audio service in this embodiment performs interference control on another interfering terminal, in this embodiment, the antenna 501 is further configured to receive a signal parameter sent by another terminal, and the processor 502 is further configured to generate the second message when it is determined, according to the signal parameter and an interference control distance threshold parameter when the terminal executes the audio service, that the other terminal falls within a controlled range.

If the terminal provided in this embodiment is the terminal executing the audio service, the processor 502 is further configured to, when the terminal executes the audio service, send the second message using the antenna 501. The second message carries the interference control parameter.

For detailed description of the second message in this embodiment, refer to the description of the first message sent by the first terminal in step 101 shown in FIG. 1A, and details are not described in this embodiment.

Optionally, the processor 502 is further configured to detect, by the terminal, displacement of the terminal when the terminal executes the audio service, and when the displacement exceeds a preset threshold, send a third message using the antenna 501. The third message carries an interference control distance threshold parameter and a signal parameter.

For a specific process of sending the third message by the processor 502 using the antenna 501 in this embodiment, refer to the specific process of detecting the displacement of the first terminal by the first terminal when the first terminal executes the audio service, and sending the second message to the second terminal by the first terminal when the displacement exceeds the preset threshold in step 106 shown in FIG. 1A. Details are not described in this embodiment.

In this embodiment, when the terminal is the interfering terminal on which interference control needs to be performed, the processor 502 determines, according to the first message received by the antenna 501, that the terminal supports the interference control, and that the terminal falls within the controlled range, and adjusts the setting of the terminal according to the interference control parameter. If the processor 502 receives the fourth message using the antenna 501, the processor 502 determines that a movement of the displacement of the terminal that is executing the audio service exceeds the preset threshold, and then the processor 502 redetermines whether the terminal falls within the controlled range. If the terminal is the terminal that is executing the audio service, the processor 502 may send, using the antenna 501, the second message for performing interference control on the interfering terminal. During execution of the audio service, when the displacement of the terminal exceeds the preset threshold, the processor 502 may further send the third message using the antenna 501. It can be learned that according to the terminal in this embodiment, an interference control process is implemented easily without complex operations at low costs, and accuracy of interference control for the audio service is improved.

It may be clearly understood by persons skilled in the art that, for the purpose of convenient and brief description, for a detailed working process of the foregoing system, apparatus, and unit, refer to a corresponding process in the foregoing method embodiments. Details are not described herein.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A method for controlling interference in an audio service, comprising:
receiving, by a terminal, a first message using a short-range wireless communications technology, the first message carrying an interference control parameter indicating an action to be performed by the terminal; and
determining, by the terminal according to the interference control parameter, that the terminal supports interference control, and that the terminal falls within a controlled range; and
adjusting, by the terminal, a setting of the terminal according to the interference control parameter to reduce or avoid noise interference caused to another terminal by the terminal.

2. The method of claim 1, wherein the first message further carries an interference control distance threshold parameter and a signal parameter, and that the terminal falls within the controlled range comprising:
determining, by the terminal according to the interference control distance threshold parameter and the signal parameter that are carried in the first message, that the terminal falls within the controlled range.

3. The method according to claim 2, wherein the signal parameter is a parameter related to distance measurement, and the signal parameter comprises at least one of the following:
signal receiving time and signal sending time, or received signal power, or transmitted signal power.

4. The method of claim 1, wherein the step of adjusting, by the terminal, a setting of the terminal according to the interference control parameter when the terminal supports the interference control, and the terminal falls within a controlled range comprising:
adjusting, by the terminal, the setting of the terminal according to the interference control parameter when the terminal supports the interference control, the terminal falls within the controlled range, and the terminal is generating a sound.

5. The method of claim 1, wherein the first message further carries an interference control duration parameter, and the adjusting, by the terminal, a setting of the terminal according to the interference control parameter when the terminal determines, according to the interference control parameter, that the terminal supports interference control, and that the terminal falls within a controlled range is specifically:
configuring, by the terminal, the setting of the terminal according to the interference control duration parameter and the interference control parameter when the terminal supports the interference control, and the terminal falls within the controlled range.

6. The method of claim 1, wherein the method further comprises:
receiving, by the terminal, a second message, wherein the second message carries an interference control distance threshold parameter and a signal parameter; and
restoring, by the terminal, the setting of the terminal when the terminal determines, according to the interference control distance threshold parameter and the signal parameter that are carried in the second message, that the terminal falls beyond the controlled range.

7. The method of claim 1, wherein the interference control parameter is used to indicate that the action to be performed by the terminal comprises at least one of the following actions:
muting, decreasing volume, pausing, switching to a headset mode, or turning off.

8. A terminal, comprising:
an antenna configured to receive a first message, the first message carrying an interference control parameter, and the interference control parameter indicating an action to be performed by the terminal; and
a processor coupled to the antenna and configured to:
determine, according to the interference control parameter, that the terminal supports interference control, and that the terminal falls within a controlled range; and
adjust a setting of the terminal according to the interference control parameter to reduce or avoid noise interference caused to a terminal sending the first message.

9. The terminal of claim 8, wherein the processor is further configured to send a second message carrying the interference control parameter using the antenna when the terminal executes an audio service.

10. The terminal of claim 9, wherein the antenna is further configured to receive a signal parameter from another terminal, and the processor being further configured to:
determine, according to the signal parameter and an interference control distance threshold parameter when the terminal executes the audio service, that the other terminal falls within the controlled range; and
generate the second message.

11. The terminal of claim 8, wherein the first message further carries an interference control distance threshold parameter and a signal parameter, and the processor being further configured to determine, according to the interference control distance threshold parameter and the signal parameter carried in the first message, that the second terminal falls within the controlled range.

12. The terminal of claim 8, wherein when adjusting the setting of the terminal, the processor being further configured to adjust the setting of the terminal according to the interference control parameter when the terminal supports the interference control, the terminal falls within the controlled range, and the terminal generates a sound.

13. The terminal of claim 8, wherein the first message further carries an interference control duration parameter, and when adjusting the setting of the terminal, the processor being further configured to configure the setting of the terminal according to the interference control duration parameter and the interference control parameter when the terminal supports the interference control, and the terminal falls within the controlled range.

14. The terminal of claim 8, wherein the processor is further configured to:
detect, by the terminal, displacement of the terminal when the terminal executes an audio service; and
send a third message carrying an interference control distance threshold parameter and a signal parameter using the antenna when the displacement exceeds a preset threshold.

15. The terminal of claim 8, wherein the antenna is further configured to receive a fourth message, and the processor being further configured to:
   determine, according to an interference control distance threshold parameter and a signal parameter carried in the fourth message, that the terminal falls beyond the controlled range; and
   restore the setting of the terminal.

16. The terminal of claim 8, wherein the interference control parameter indicating that the action to be performed by the terminal comprises at least one of muting, decreasing volume, pausing, switching to a headset mode, or turning off.

17. The terminal of claim 8, wherein a signal parameter comprises a parameter related to distance measurement, and the signal parameter comprising at least one of signal receiving time, signal sending time, received signal power, or transmitted signal power.

* * * * *